US006294616B1

(12) United States Patent
Rhodes et al.

(10) Patent No.: US 6,294,616 B1
(45) Date of Patent: *Sep. 25, 2001

(54) BLENDS AND ALLOYS OF POLYCYCLIC POLYMERS

(75) Inventors: Larry F. Rhodes, Silverlake; Brian L. Goodall, Akron, both of OH (US); Rolf Mülhaupt, Feiburg (DE); Robert A. Shick, Strongsville, OH (US); George M. Benedikt, Solon, OH (US); Sai Kumar Jayaraman, Cuyahoga Falls, OH (US); Lynn M. Soby, Brecksville, OH (US); Lester H. McIntosh, III, Cuyahoga Falls, OH (US)

(73) Assignee: B. F. Goodrich Company, Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/450,648

(22) Filed: May 25, 1995

(51) Int. Cl.[7] .......................... C08F 10/14; C08F 232/08; C08F 236/20
(52) U.S. Cl. ...................... 525/332.1; 526/281; 526/282; 526/283; 526/284
(58) Field of Search .............................. 526/281; 525/100, 525/105, 106, 479, 285, 289, 317

(56) References Cited

U.S. PATENT DOCUMENTS

| | | |
|---|---|---|
| 3,226,353 | 12/1965 | Engle et al. . |
| 3,891,816 | 6/1975 | Scot et al. . |
| 4,039,491 | 8/1977 | Ikeda et al. . |
| 5,331,057 * | 7/1994 | Brekner ................................ 525/289 |
| 5,334,664 * | 8/1994 | Tomida ................................ 525/289 |
| 5,359,001 | 10/1994 | Epple et al. . |
| 5,414,044 * | 5/1995 | Moriya ................................ 525/74 |
| 5,468,819 | 11/1995 | Goodall et al. . |
| 5,569,730 * | 10/1996 | Goodall et al. ........................ 526/171 |
| 5,571,881 * | 11/1996 | Goodall et al. ........................ 526/171 |
| 5,783,639 * | 7/1998 | Kataoka et al. ........................ 525/286 |

FOREIGN PATENT DOCUMENTS

| | | |
|---|---|---|
| 2153753 | 1/1996 | (CA) . |
| 2153757 | 1/1996 | (CA) . |
| 0234683 * | 4/1986 | (DE) . |
| 0466279 | 1/1992 | (EP) . |
| 0570126 | 11/1993 | (EP) . |
| 1376446 * | 12/1974 | (GB) . |
| 61-060727 * | 3/1986 | (JP) . |
| 9514048 | 5/1995 | (WO) . |

OTHER PUBLICATIONS

*Polymers Alloys and Blends. Thermodynamics and Rheology* by L. A. Utracki, Hanser, Munich, 1989, p. 124.

"Advances in the Epoxidation of Unsaturated Polymers" by J. H. Bradbury and M. C. Senka Perera *Ind. Eng. Chem. Res.*, 1988, 27, p. 2196.

"Metal Catalyzed, Highly Selective Oxygenations of Olefins and Acetylenes with tert–Butyl hydroperoxide. Practical Considerations and Mechanisms" by K. B. Sharpless and T. R. Verhoeven, *Aldricmica Acta*, 1979, 12, p.63.

*Principles and Applications of Organotransition Metal Chemistry* by J. P. Collman, L. S. Hegedus, J. R. Norton, and R. G. Finke, University Science Books, Mill Valley CA, 2nd ed., 1987, p. 621.

*Homogeneous Catalysis* by G. W. Parshall and S. D. Ittel, John Wiley & Sons, 2nd ed., 1992, p. 106.

*Comp. Organomet. Chem.* by I. Tkatchenko, G. Wilkinson, F. G. Stone, E. W. Abel, eds., Pergamon, 1982, vol. 8, p. 173.

*Homogeneous Catalysis* by G. W. Parshall and S. D. Ittel, John Wiley & Sons, 2nd ed., 1992, p. 101.

*Homogeneous Catalysis* by G. W. Parshall and S. D. Ittel, John Wiley & Sons, 2nd ed., 1992, p. 42.

*Advances in Organometallic Chemistry* by J. L. Speier, 1979, vol. 17, p. 407.

*Maleic Anhydride* by B. C. Trivedi and B. M. Culbertson, Plenum Press, New York, 1982, pp. 459–465.

"Studies on Polymer Blend of Nylon 6 and Polypropylene or Nylon 6 and Polystyrene Using the Reaction of Polymer" by F. Ide and A. Hasegawa, *J. Appl. Polym. Sci.*, 18(4), 963, 1974.

Chemical Abstracts, vol. 83, No. 20, Nov. 17, 1975 (164865a).

* cited by examiner

Primary Examiner—Jeffrey C. Mullis

(57) ABSTRACT

Polycyclic addition polymers derived from norbornene-type monomers are mixed with a variety of other polymers to generate families of new blends, alloys, and block copolymers.

11 Claims, No Drawings

BLENDS AND ALLOYS OF POLYCYCLIC POLYMERS

BACKGROUND OF THE INVENTION

Addition polymers derived from norbornene-type monomers exhibit a number of physical and mechanical properties, some of which are highly desirable while others are less desirable or even undesirable. For example, the addition homopolymer of norbornene, i.e., poly(bicyclo [2.2.1.]hept-2-ene) exhibits some excellent characteristics such as optical clarity, low moisture absorption, and extremely high thermomechanical resistance having a glass transition temperature of about 380° C. On the other hand, this same homopolymer is very brittle requiring improved toughness for many applications. A well known effective method of improving the properties of a polymer is to blend or alloy the polymer with another polymer (or polymers) in order to optimize a given property, e.g., toughness or heat distortion temperature.

A polymer blend is simply a mixture of two or more polymers. The polymer blend, however, can be either immiscible or miscible depending on the value of the free energy of mixing between the polymeric species. For a negative free energy of mixing, the thermodynamics are favorable for a miscible polymer blend; typically a one-phase system results. For a positive free energy of mixing an immiscible polymer blend results giving, typically, a multi-phase system. To change the morphology of a blend, the interfacial properties of the blend must be changed. One method to accomplish this is to add a compatibilizing agent to the blend. According to L. A. Utracki (*Polymer Alloys and Blends. Thermodynamics and Rheology.* Hanser, Munich, 1989, p. 124) the "goal of compatibilization is to obtain a stable and reproducible dispersion which would lead to the desired morphology and properties." This can be accomplished in the following ways: 1) add linear, graft, or random copolymers to a polymer blend; 2) coreact in the blend to generate in-situ either copolymer, interacting polymers or interpenetrating networks (by the synthesis of one of the polymers in the presence of the second polymeric constituent); or 3) modify the homopolymers by incorporation of functional groups. In many cases this may result in the formation of a polymer alloy, that is, an immiscible polymer blend having a modified interface or morphology. The morphology of the polymer alloy may be a very fine (sub-micron) dispersion or relatively large depending on the compatibilizer chosen, the amount of compatibilizer added, and the desired properties of the alloy.

Incompatibility is the rule rather than the exception, particularly in the case of hydrocarbon addition polymers derived from norbornene-type monomers (e.g., polynorbornene). Blends of incompatible polymers in most instances form large domains with properties inferior to the constituents, therefore compatibilizer techniques are usually employed to maximize the strengths of the constituents while overcoming their individual deficiencies. Various attempts have been undertaken to prepare polymer compositions that are easily processable and which possess improved physical properties. Compatibilization can provide for specific interactions between polymers. In this regard, methods have focused upon the preparation and use of functionalized polymers having pendant reactive groups which facilitate the grafting of coreactive materials and other polymers to form graft-modified polymers and polymer blends having improved physical properties. Typically a polymer can be functionalized by copolymerizing the monomer with monomer(s) having a functional substituent. However, polyolefins particularly polynorbornene-type addition polymers are generally more difficult to functionalize by copolymerization processes because of the tendency of the polar groups in the monomers to poison the catalyst. To our knowledge no attempts have been made to prepare blends and alloys of polycyclic addition polymers derived from norbornene-type monomers with a variety of other dissimilar polymers.

Accordingly, it would be highly desirable to provide blends and alloys of addition polymerized norbornene-type monomers with other polymer systems.

SUMMARY OF THE INVENTION

We have found that it is possible to functionalize polynorbornene-type polymers so as to make them compatible and hence alloyable with a variety of other polymers to generate families of new blends, alloys, and block copolymers with superior balance of properties.

It is a general object of this invention to provide a functionalized polycyclic addition polymer derived from NB-type monomers.

It is another object of this invention to provide polycyclic addition polymers containing a terminal functional group.

It is a further object of this invention to provide polycyclic addition polymers that contains pendant functional groups.

It is still a further object of the invention to provide free radical graft copolymers of polycyclic addition polymers having pendant polyvinylic side blocks and maleic anhydride grafts.

It is another object of this invention to provide in situ polymerization blends of polycyclic addition polymers and reactive and nonreactive elastomeric polymers.

It is still a further object of the invention to provide chlorinated polycyclic addition polymers.

It is another object of the invention to provide miscible blends of polycyclic addition polymers and polystyrene.

In still another object of the invention to provide methods that enable functional end groups and functional pendant groups to be tailored so that desired reactions can be effected.

It is still another object of the invention to prepare olefinic A-B block copolymers with pendant polynorbornene-type side blocks.

It is a further object to react the terminal functional polycyclic addition polymers of this invention with coreactive monofunctional and difunctional polymeric materials to make A-B and A-B-A block copolymers.

We have found that it is possible to functionalize polycyclic addition polymers derived from NB-type monomers to make new materials that can be utilized as: 1) intermediates for the preparation of other functional containing polymers; 2) segment polymers for the preparation of block copolymers; 3) substrate polymers for the preparation of graft copolymers; 4) as constituent polymers in the preparation of in situ polymer blends; 5) polymers in miscible blends; 6) compatibilizers for polymer blends; and 7) thermosetting systems.

These and other objects of the present invention are accomplished by the following methods and functionalized PNB compositions. As used throughout the specification, the term PNB means polymers represented by structure II below.

DETAILED DESCRIPTION

The polycyclic addition polymers of this invention are derived from at least one norbornene-type (NB-type) monomer having the following structure:

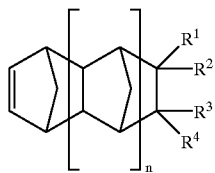

I wherein $R^1$ to $R^4$ independently represent hydrogen, linear and branched ($C_1$-$C_{20}$) alkyl; hydrocarbyl substituted and unsubstituted ($C_5$-$C_{12}$) cycloalkyl; substituted and branched ($C_5$-$C_1$-) cycloalkenyl ($C_6$-$C_{24}$) aryl; ($C_7$-$C_{15}$) arakyl; linear and branched ($C_2$-$C_{20}$) alkenyl; ($C_3$-$C_{20}$) alkynyl; any of $R^1$ and $R^2$ or $R^3$ and $R^4$ can be taken together to form a ($C_1$-$C_{10}$) alkylidene group; $R^1$ and $R^4$ when taken together with the two ring carbon atoms to which they are attached can represent saturated and unsaturated cyclic groups of 4 to 12 carbon atoms or any aromatic ring of 6 to 17 carbon atoms; and n is 0, 1, 2, 3, or 4. When n is 0 in structures I and II and in all structures in the specification and claims, it will be recognized that a bicyclic structure will be present and that substituents $R^1$ to $R^4$ will be attached to the respective ring carbon atoms in the bicyclic ring. By hydrocarbyl is meant that the substituent is composed solely of carbon and hydrogen atoms. Representative hydrocarbyl substituents include linear and branched ($C_1$-$C_{10}$) alkyl, and linear and branched ($C_2$-$C_{15}$) alkenyl.

The term NB-type monomer as used throughout the present specification is meant to include norbornene as well as any higher cyclic derivative thereof so long as the monomer contains at least one norbornene moiety as set forth in the structure above.

Representative monomers of structure I include 2-norbornene, 5-methyl-2-norbornene, 5-hexyl-2-norbornene, 5-decyl-2-norbornene, 5-phenyl-2-norbornene, 5-naphthyl-2-norbornene, 5-ethylidene-2-norbornene, 5-vinyl-2-norbornene, 5-hexenyl-2-norbornene dicyclopentadiene, dihydrodicyclopentadiene, tetracyclododecene, methyltetracyclododecene, tetracyclododecadiene, dimethyltetracyclododecene, ethyltetracyclododecene, ethylidenyl tetracyclododecene, phenyltetracyclododecene, trimers of cyclopentadiene (e.g., symmetrical and asymmetrical trimers).

The polycyclic polymers (NB-type polymers or PNB's) derived from the monomers described under structure I above are represented by the following structure:

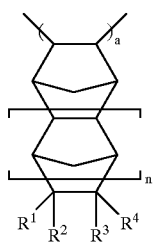

II wherein $R^1$ to $R^4$ and n are defined above; and a represents the number of repeating units present in the polymer. This invention contemplates homopolymers and copolymers containing the repeat unit described generally under structure II. The structural repeat units derived from the NB-type monomers of this invention insert into the polymer backbone via linkages derived from the double bond present in the norbornene moiety (i.e., 2,3-enchainment). The repeating units are joined directly to one another without any intermediate linkages between units. The polymer backbone is free of olefinic unsaturation.

In the first embodiment of this invention functionalized PNB's can be prepared from PNB's containing terminal olefinic unsaturation. By terminal olefinic is meant that the PNB is terminated with an α-olefin, isobutylene, or diisobutylene as follows.

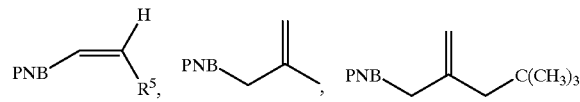

wherein $R^5$ is hydrogen or linear or branched ($C_1$-$C_{10}$) alkyl. Representative $R^5$ substituents include hydrogen, methyl, ethyl, propyl, i-propyl, butyl, t-butyl, and pentyl radicals. Terminal olefinic unsaturation and terminal isobutylene, or diisobutylene polynorbornene-type polymers containing unsaturation can be prepared by the novel chain transfer mechanism of the catalyst system of copending patent application U.S. Ser. No. 08/339,863 filed on Nov. 15, 1994, which is incorporated herein by reference. Terminal unsaturated PNB's such as vinyl-terminated and isobutylene-terminated PNB, provide an entry point to access a host of functionalized PNB's specifically at the polymer chain end. These polymer chain end functional PNB's can be accessed by a variety of stoichiometric as well as catalytic reactions known to those skilled in the art of carbon-carbon double bond chemistry.

PNB's having terminal olefinic moieties can be functionalized by formation of, but are not limited to, epoxy, monoalcohol, diol, anhydride, aldehyde, carboxylate, dicarboxylate, amide, nitrile, amine, and sulfonate moieties.

Terminal PNB-epoxides can be prepared from the reaction of an α-olefin or isobutylene terminated PNB and m-chloro-perbenzoic acid (MCPBA) in an appropriate solvent as follows:

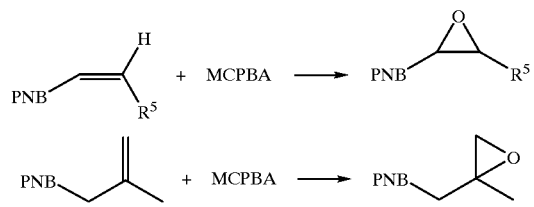

The terminal PNB-epoxides can also be prepared by reaction with other hydroperoxide or hydroperoxide mixtures such as t-butylperoxide or hydrogen peroxide and acetic acid mixtures as related by J. H. Bradbury and M. C. Seneka Perera in *Ind. Eng. Chem. Res.* 1988, 27, 2196. The PNB-epoxides can also be prepared via catalytic epoxidations using well-known transition metal catalysts as detailed by K. B. Sharpless and T. R. Verhoeven in *Aldrichimica Acta* 1979, 12, 63.

The terminal PNB-monoalcohol can be prepared from the reaction of vinyl terminated PNB with 9-borobicyclo[3.3.1] nonane (9-BBN) followed by hydrogen peroxide, and NaOH in an appropriate solvent as follows:

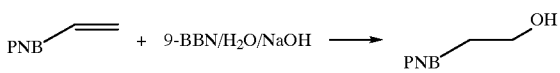

The terminal anhydride-PNB can be prepared by the reaction of isobutylene terminated PNB and maleic anhydride (ene reaction). The reaction is schematically represented as follows:

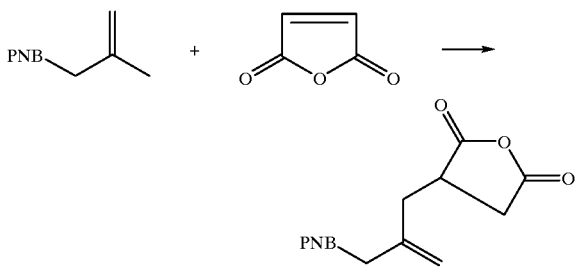

The terminal anhydride-PNB can be further reacted under acidic or basic conditions to form a dicarboxylate functional-PNB.

The diol terminated PNB can be prepared by the reaction of an epoxy terminated PNB with $HClO_4/H_2O$ (perchloric acid). The reaction scheme is set forth below:

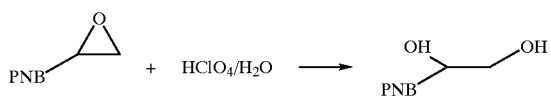

The aldehyde terminated PNB can be prepared from the hydroformylation of an isobutylene terminated PNB as shown below:

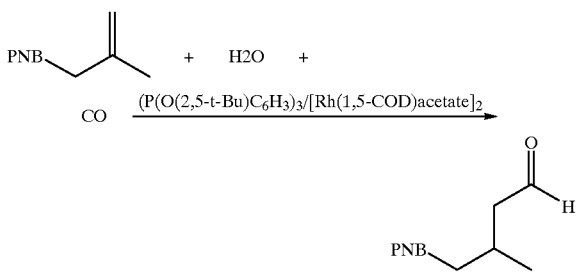

It is also contemplated that the aldehyde end group moiety can be further reacted with hydrogen to form the alcohol-terminated PNB catalytically. This transformation is well-known to those skilled in the art of the "oxo" process as described in *Principles and Applications of Organotransition Metal Chemistry* by J. P. Collman, L. S. Hegedus, J. R. Norton, and R. G. Finke, University Science Books, Mill Valley, Calif., 2nd ed., 1987, p. 621 and in *Homogeneous Catalysis* by G. W. Parshall and S. D. Ittel, John Wiley & Sons, 2nd ed., 1992, p. 106. This transformation is typically carried out using a suitable cobalt or rhodium catalyst such as phosphine-modified dicobalt octacarbonyl and phosphine-modified rhodium complexes.

Further catalytic transformations of the terminal olefinic unsaturated PNB are contemplated such as, but not limited to, azacarbonylation, hydrocarboxylation and hydrocyanation to yield amide-functional, carboxylate or carboxylic acid-functional, and nitrile-functional PNB's, respectively. Azacarbonylation is typically carried in the presence of mainly nickel and cobalt catalysts and in presence of ammonia, aliphatic amines, or aromatic amines as related by I. Tkatchenko in *Comp. Organomet. Chem.* G. Wilkinson, F. G. A. Stone, E. W. Abel, eds., Pergamon, 1982, vol. 8, p. 173. Hydrocarboxylation is typically carried out in the presence of a cobalt catalyst such as dicobalt octacarbonyl under CO pressure in either an alcohol (to form the carboxylate) or water (to form the carboxylic acid) cosolvent as related in *Homogeneous Catalysis* by G. W. Parshall and S. D. Ittel, John Wiley & Sons, 2nd ed., 1992, p. 101. Hydrocyanation is typically carried out in the presence of nickel tetrakis(phosphine) or phosphite complexes and hydrogen cyanide as related in *Homogeneous Catalysis* by G. W. Parshall and S. D. Ittel, John Wiley & Sons, 2nd ed., 1992, p. 42. It is further contemplated that the nitrile functionality can be hydrogenated to the terminal amine functionality using stoichiometric reagents such as lithium aluminum hydride or catalysts such as $RhH(PPr^i_3)_3$ and $H_2$ or Raney nickel and sodium borohydride in alcohols.

A further embodiment of this invention includes the sulfonation of the terminal olefinic unsaturated PNB using sulfonation reagents such as acetyl sulfate (a mixture of sulfuric acid and acetic anhydride). This transforms the terminal olefinic unsaturated PNB into a sulfonic acid that may be neutralized using bases such as lithium hydroxide or magnesium hydroxide to form ionomeric species.

The acrylate terminated PNB can be prepared by the reaction of a hydroxy-terminated PNB and acryloyl chloride as shown by the following reaction scheme:

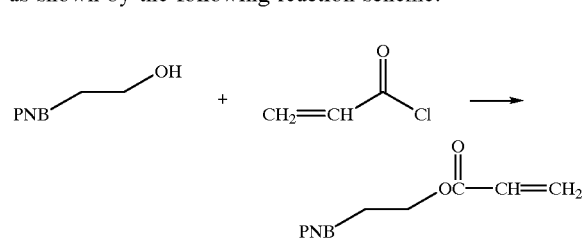

The terminal olefinic, isobutyl, and diisobutyl PNB polymers used in the preparation of terminal functional PNB's of this invention can be prepared from a reaction mixture comprising one or more norbornene-type monomer(s), a [(crotyl) Ni(COD)][LPF$_6$] catalyst in the presence of a chain transfer agent (CTA) all in an appropriate solvent. The CTA is selected from a compound having a terminal olefinic double bond between adjacent carbon atoms, wherein at least one of the adjacent carbon atoms has two hydrogen atoms attached thereto. The CTA is represented by the formulae:

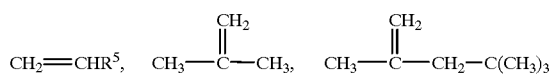

wherein $R^5$ is as defined above. Preferred CTA's include ethylene, propylene, isobutylene, 4-methyl-1-pentene, 1-hexene, 1-decene, and 1-dodecene.

The CTA's incorporate exclusively as terminal end-groups on each PNB chain. The CTA's do not copolymerize into the PNB backbone. A representative structure is shown below:

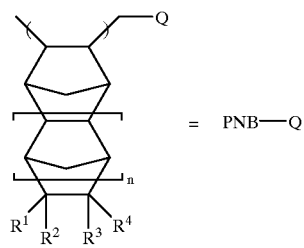

wherein Q is derived from the CTA defined above.

The terminal functional PNB polymers of this invention can be reacted with any coreactive moiety containing a functional group that is reactive with the terminal functional group on the PNB polymer. The coreactive moiety can be monomeric, oligomeric, or polymeric and the term as used herein refers to coreactive plasticizers, lubricants, impact modifiers, heat distortion modifiers, processing aids, compatibilizers, and polymers.

The terminal functional PNB's of this invention can be utilized to prepare A-B and A-B-A block copolymers of PNB with coreactive polymer, oligomers or macromonomers having a functional group (preferably terminal functional) that is reactive with the terminal functional group on the PNB.

Exemplary of the block copolymers that can be prepared in accordance with this invention is the reaction of a monohydroxy terminated PNB with a monofunctional moiety (e.g., acid chloride) to give an A-B block copolymer as follows:

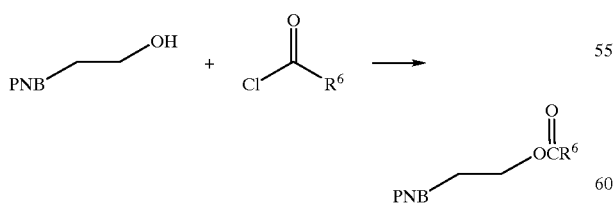

wherein $R^6$ polybutadiene, polyisoprene, polystyrene poly (α-methylstyrene), polymethylmethacrylate, polyalkylacrylates such as polybutylacrylate, or other anionically polymerized polymers that can be functionalized to an acid.

If a difunctional acid chloride is employed, an A-B-A block copolymer can be obtained as follows:

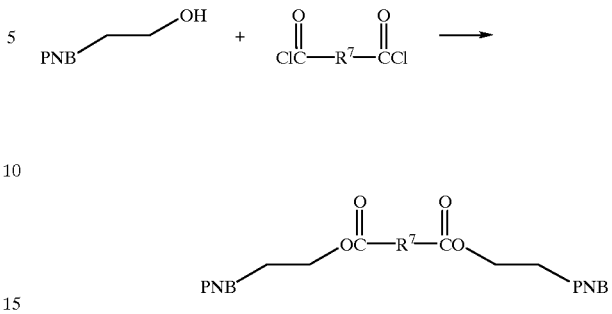

wherein $R^7$ represents polybutadiene, polyisoprene, polystyrene, poly(α-methylstyrene), polybutylacrylate, polyester, polyamide, polyamic ester, polyether.

If a monofunctional isocyanate is employed, the PNB will be end-capped with an urethane group as follows:

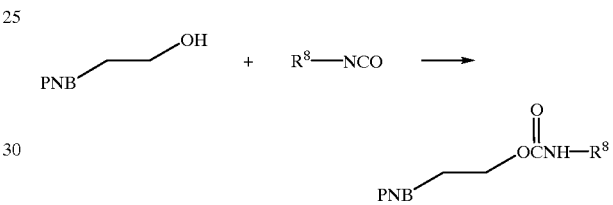

wherein $R^8$ is hydrocarbyl and silyl such as (trialkoxy)silyl isocyanate. By hydrocarbyl is meant linear and branched ($C_1$-$C_{15}$) alkyl, linear and branched ($C_1$-$C_2$) alkenyl, ($C_6$-$C_{20}$) aryl, and aralkyl ($C_6$-$C_{15}$).

The case of a diisocyanate the following A-B-A block copolymer is formed:

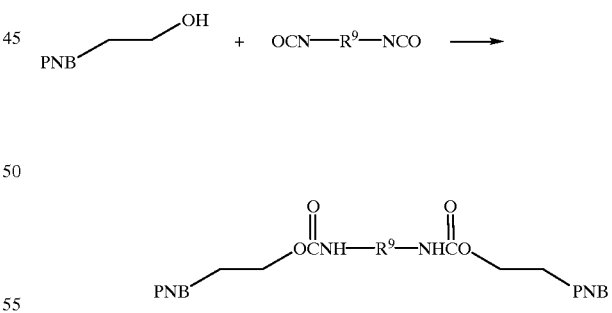

wherein $R^9$ represents a polyurethanes, polyureas, and polythioureas.

Vinyl terminated PNB can be subjected to a hydrosilation reaction in the presence of a platinum catalyst as related by J. L. Speier in *Advances in Organometallic Chemistry* 1979, Vol. 17, p. 407, to give A-B-A block copolymers wherein the PNB comprises the A blocks with a polysiloxane B block as follows:

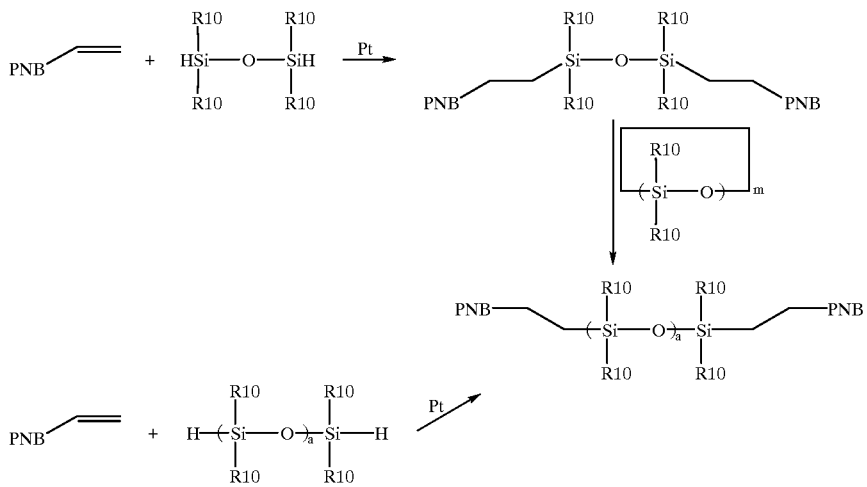

wherein R$^{10}$ independently represents (C$_1$-C$_{15}$) alkyl, (C$_6$-C$_{20}$) alkyl, or (C$_6$-C$_{24}$) aralkyl, m is 2 to 10, a represents the number of repeating units of the siloxane unit.

In this same manner epoxy terminated PNB can be reacted with a difunctional acid terminated polybutadiene (HOOC-polybutadiene-COOH) or an aliphatic diacid (HOOC-R-COOH) to give A-B-A block copolymer products.

In addition, polymers with terminal-olefin unsaturation such as, for example, allyl terminated polyisobutylene can be directly appended to the terminal end of a PNB via the chain transfer mechanism utilized to prepare the olefin terminated PNB starting materials of this embodiment. In this manner a variety of PNB A-B block copolymers can be synthesized. Other polymers that can function as polymeric chain transfer agents are olefinic terminated polyolefins such as polyethylene, polypropylene, and ethylene/propylene (diene) rubber.

In another embodiment of this invention functionalized PNB's can be prepared from PNB starting materials that contain olefinic unsaturation that is pendant from the polycyclic structural repeat unit (i.e., pendant olefinic PNB). Groups that provide pendant olefinic unsaturation are (C$_1$-C$_{10}$) alkylidene (C$_2$-C$_{10}$) alkenyl wherein the unsaturated double bond is at the terminal end of the substituent (C$_5$-C8) cycloalkenyl, and a (C5-C$_8$) fused ring cycloalkenyl ring structure. Preferred substituents include ethylidene, vinyl, cyclohexenyl, and a cyclopentene ring taken together with two adjacent carbon atoms on the polycyclic repeating unit (i.e., dicyclopentadiene). Representative PNB's with pendant unsaturation are set forth as follows:

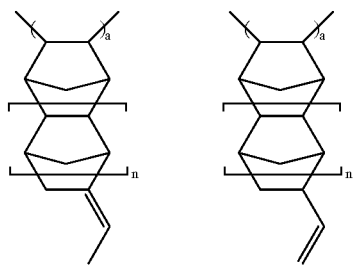

-continued

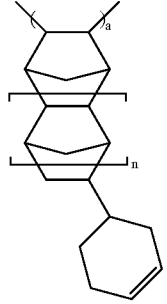 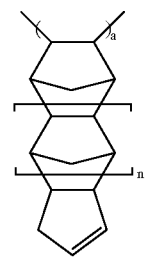

where a represents the number of repeating units in the polymer. It should be understood that the PNB's so functionalized can include repeat units set forth under formula I.

The foregoing polymers are polymerized from one or more monomers selected from formula I. Homopolymers and copolymers are contemplated within the scope of this embodiment.

The PNB's with pendant unsaturation are made by copolymerization of the respective comonomer constituents using nickel-based catalysts. The nickel-based catalyst system may include the addition of nickel-(II) ethylhexanoate to a dichloroethane solution of the comonomers and a suitable chain-transfer agent (an alpha-olefin such as 1-decene) if desired to control molecular weight, followed by the addition of a trialkyl aluminum (e.g., triethylaluminum, tri-iso butylaluminum, etc.), followed by a chlorinated activator (e.g., hexachloroacetone, chloranil, etc.). Additionally the nickel-based catalyst system may include the addition of a Brønsted acid such as HSbF$_6$ to nickel (II) ethylhexanoate, followed by addition of this mixture to a dichloroethane solution of the comonomers (optionally including a chain-transfer agent), followed by addition of BF$_3$.Et$_2$O and a trialkylaluminum such as triethylaluminum.

As with the PNB's containing terminal olefinic unsaturation, the PNB's containing pendant unsaturation can be functionalized to form epoxy, monoalcohol, diol, carboxylate, anhydride, sulfonate, amide, nitrile, and amine. The PNB's containing pendant olefinic groups can be prepared in the same manner as described above for the PNB's containing terminal olefinic groups. The following reaction scheme is illustrative of pendant olefinic PNB functionalization via epoxidation.

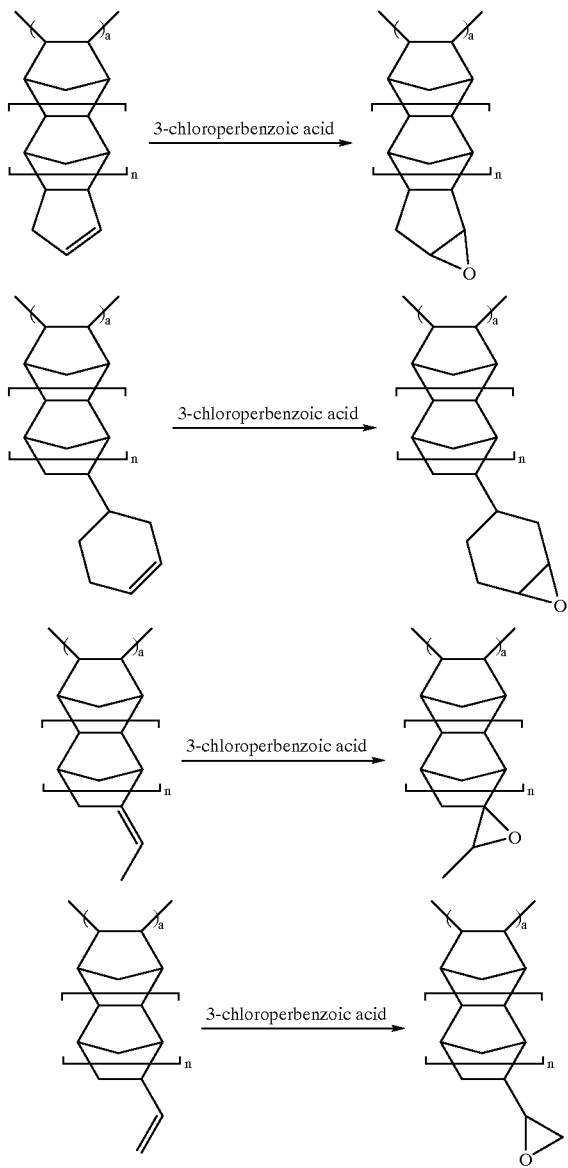

The pendant epoxide functionality can be converted to the diol as described above in the terminal functional epoxide embodiment. As with the terminal functional epoxy PNB's, the PNB's with pendant epoxide functionality can be coreacted with acid and diacid chlorides set forth above to give A-B and A-B-A block copolymers. In general the epoxide pendant functionality undergoes any reaction that the monoepoxides discussed above can undergo.

Polynorbornene copolymers such as PNB/ENB, PNB/vinyl norbornene, PNB/cyclohexyl norbornene and PNB/DCPD, most preferably PNB/DCPD copolymer containing reactive unsaturated groups and whose molecular weight ($M_n$) ranges from 225 to 15,000 g/mole, preferably range being from 1,000 to 5,000 g/mole, can be epoxidized using peracids such as peracetic acid, perbenzoic acid, m-chloro perbenzoic acid, most preferably m-chloro perbenzoic acid. Such epoxidized PNB copolymers can be used as multifunctional epoxy material in standard epoxy formulations to obtain a three dimensional insoluble and infusible network.

Thus epoxidized PNB copolymers can be dissolved in both aromatic and aliphatic di and multifunctional epoxy resins such as Epon 828, epoxy phenolic novolac resins, epoxy cresol novolac resins, 3',4',epoxycyclohexylmethyl 3,4-epoxy cyclohexanecarbonate, 3,4-epoxy cyclohexyloxirane, 2-(3',4'-epoxycyclohexyl)-5,1'-spiro-3',4'-epoxy cyclohexane-1,3-dioxane, the most preferred being the 3,4-epoxy cyclohexyloxirane, and treated with a hardener or curing agent; its choice depending on the processing method, curing condition and the properties desired. The hardener can be either catalytic or coreactive in nature. Catalytic curing agent could be trialkyl amines, boron trifluoride amine complexes and photoinitiated cationic curing agents such as aryldiazonium salts, diaryliodonium salts and onium salts of group VI a elements, especially salts of positively charged sulfur compounds. The most preferred catalytic hardener is the boron trifluoride amine complexes. Coreactive hardeners can be selected from primary and secondary aliphatic and aromatic amines, such as methylene diamine, diaminodiphenyl sulfone, dicynadiamide, diethylenetriamine, triethylenetetramine, preferably diaminodiphenyl sulfone, aliphatic and aromatic mercaptans, di and multifunctional isocyanate, di and multifunctional polyester and polyether carboxylic acids and acid anhydrides. Selected acid anhydrides are phthalic anhydride, tetrahydrophthalic anhydride, methyl tetrahydrophthalic anhydride, hexahydrophthalic anhydride, nadic methyl anhydride and chlorendic anhydride. Thus the epoxy resin containing 10 to 50 weight percent of epoxidized PNB copolymer, the most preferable amount being from 5 to 25 wt. %, can be treated with the hardener at temperatures ranging from about 80° C. to about 200° C. depending on the hardener of choice and the properties of the network desired. The most preferred temperature being 150° C. These PNB copolymer containing materials are phase separated in nature with the domain size of the PNB phase depending on the molecular weight and the functionality of the epoxidized PNB copolymer used. The multifunctional epoxy materials of this invention provide crosslinked materials with high glass transition temperature, low moisture uptake, good electrical properties, good corrosion/solvent resistance and low shrinkage on cure.

Thermosets can also be prepared from the PNB's having pendant unsaturation by heating the homopolymers or copolymers containing pendant vinyl, alkylidene such as ethylidene, fused ring cyclopentenyl, cyclopentenyl and cyclohexeneyl in the presence of a free radical polymerization initiator such as azobisisobutyonitrile, benzoyl peroxide, lauroyl peroxide, t-butylperoxypivalate, t-butylperoxyacetoate, and α-cumyl peroxyneodecaneoate in an approate solvent. Suitable solvents include hydrocarbons, halohydrocarbons, aromatics and haloaromatics. The amount of peroxide initiator ranges from about 0.1 to 5.8% by weight after polymer.

Because of the exceptionally high temperature properties of polycyclic addition polymers, it would be useful to blend them with polymer systems of lesser high temperature properties (e.g., heat distortion) in order to raise the heat distortion properties of the target system. However, in order to make an effective blend it is necessary that the polymer components exhibit at least partial miscibility and that some degree of domain size control be achievable. For example, it would be highly desirable to improve the heat distortion temperature of CPVC in order to increase its commercial applicability in high temperature applications, e.g., high temperature pipe, etc. However, CPVC and polynorbornene (non-functionalized) are completely immiscible and the resulting blend exhibits no useful improvement in properties. We have discovered that by introducing epoxy functionality into the PNB (e.g., terminal and/or pendant functional) yields optically clear blends with CPVC which is particularly attractive due to the stabilizing effects of the epoxide moiety against dehydrohalogenation.

The CPVC polymers suitable for use in the blends of this invention are readily commercially available. The chlorine content typically ranges from about 61 to about 72 weight percent, preferably from about 63 to about 68 weight percent. The inherent viscosity of the CPVC ranges from about 0.46 to about 1.2, preferably from about 0.68 to about 0.92. The inherent viscosity (I.V.) is a representative measure of the molecular weight of a polymer and is obtained in accordance with ASTM D-1243-66.

In another embodiment of the invention polycyclic polymers derived from NB-type monomers can be modified by grafting free radical polymerizable monomers forming grafted side chains to or from the polycyclic backbone of the PNB. In this embodiment free radically polymerizable monomers containing vinyl unsaturation, i.e., a $H_2C=C$ (moiety can be polymerized in the presence of the PNB. The PNB is dissolved in a common solvent for the PNB and vinyl-type monomer. A free radical catalyst initiator is added to the medium and the medium is then heated at elevated temperature to conduct the grafting reaction.

Suitable solvents include hydrocarbons, halohydrocarbons, aromatics, and haloaromatics. Preferred solvents are the aromatics and haloaromatics such as toluene, xylene, benzene, and chlorobenzene. It should be noted that the vinyl-type monomer can function as the solvent so long as it can dissolve the PNB. For example, PNB was observed to be soluble in styrene. In this case an additional solvent is not necessary.

The temperature range of the reaction is from about 80° C. to about 150° C., preferably about 120° C.

Suitable catalytic initiators include organic peroxides such as lauroyl peroxide, benzoyl peroxide, diacetyl peroxide, 5-butyl-peroxyneodeconate, t-butylcumyl peroxyneodecanoate, di-n-propyl peroxydicarbonate, di-t-butyl peroxide, and di-sec-butyl-peroxydicarbonate. The preferred peroxide is di-t-butyl peroxide.

Exemplary of the vinyl-type monomers are styrenes, acrylates, methacrylates, acrylamides, acrylonitriles, and vinyl monomers.

The styrenes are selected from compounds of the formula:

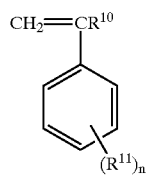

wherein n is independently 0, 1, 2, 3, 4, or 5, $R^{10}$ is hydrogen or methyl, and $R^{11}$ independently represents, hydrogen, halogen, linear and branched ($C_1$-$C_6$) alkyl, ($C_6$-$C_{12}$) alkoxy, ($C_6$-$C_{20}$) aryl, ($C_6$-$C_{20}$) aryloxy, —N($R^{12}$)$_2$, —SO$_2R^{12}$, where $R^{12}$ independently represents hydrogen, linear, and branched ($C_1$-$C_{10}$) alkyl, and ($C_6$-$C_{12}$) aryl and trifluoromethyl. Preferred compounds of the above formula includes styrene and α-methyl styrene.

The acrylates and methacrylates are selected from compounds of the formula:

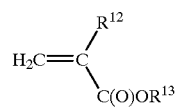

wherein $R^{12}$ is hydrogen, linear, or branched ($C_1$-$C_5$) alkyl, ($C_6$-$C_{12}$) alkyl, nitrile, and halogen; $R^{13}$ is hydrogen, linear, or branched ($C_1$-$C_{20}$) alkyl, ($C_1$-$C_{10}$) hydroxy substituted alkenyl.

The acrylamides are selected from compounds of the formula:

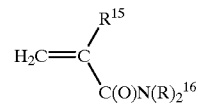

wherein $R^{15}$ is hydrogen, linear, or branched ($C_1$-$C_5$) alkyl, ($C_6$-$C_{12}$) aryl, and halo; $R^{16}$ independently represents hydrogen, linear, or branched ($C_1$-$C_5$) alkyl, and ($C_6$-$C_{12}$) aryl.

The acrylonitriles are selected from compounds of the formula:

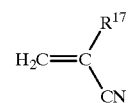

wherein $R^{17}$ is hydrogen, linear, or branched ($C_1$-$C_5$) alkyl, ($C_6$-$C_{12}$) aryl, halo, and nitrile.

The vinyl monomers are selected from compounds of the formula:

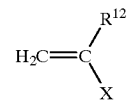

wherein $R^{18}$ is hydrogen, Cl, Br, and F, linear or branched ($C_1$-$C_5$) alkyl, ($C_6$-$C_{12}$) aryl; and X is Cl, Br, F, linear or branched ($C_1$-$C_5$) alkyl, ($C_2$-$C_{20}$) alkenyl, ($C_6$-$C_{12}$) aryl, ($C_6$-$C_{18}$ aryl ethers, —OAc, aryl ethers, tri ($C_1$-$C_{10}$) alkoxysilanes, and allyl ($C_1$-$C_{10}$) trialkoxysilanes.

In a preferred embodiment, is has been discovered that the PNB's containing pendant unsaturation on the PNB backbone enhance the grafting of the free radically polymerized side chains on to the PNB backbone. It is thought that the allylic hydrogen atoms (exclusive of the bridgehead hydrogens) provides an active site for more efficient grafting of the free radically polymerized vinyl-type monomer.

Another embodiment of this invention concerns a process and polymer composition in which an elastomer is solution blended with norbornene-type monomer(s) in a suitable solvent (i.e., a solvent that dissolves the norbornene-type monomer, the resulting norbornene-type polymer, and the elastomer but does not interfere with the polymerization). The norbornene-type monomer is then polymerized by addition of a multicomponent catalyst system comprising a Group VIII transition metal compound in combination with an organoaluminum compound and an optional third component selected from Lewis acids, Brønsted acids, and halogenated compounds. Such catalysts are described in copending U.S. patent application Ser. No. 08/339,863 filed on Nov. 15, 1994 which is herein incorporated by reference. In this one-step process, a more intimate mixture or blend of the elastomer and the resulting polynorbornene is formed than can be obtained by melt blending. This process referred to herein as nonreactive in situ blending because no covalent bonding occurs between the subsequently formed PNB and elastomer. The same morphology is obtained by solution blending a completely polymerized PNB and mixing with an elastomer. Likewise, unreacted blends with suitable plasticizers have been found to be a miscible with NB-type polymers exhibiting a reduced glass transition for the blend. Suitable plasticizers include hydrogenated cyclopentadiene oligomers (sold under the trademark Escorez® by Exxon Chemicals) and at linear and branched alkane ranging from $C_{14}$-$C_{34}$, most preferably $C_{24}$-$C_{30}$.

In this case an elastomer is defined as any polymeric material which has a low glass transition temperature ($T_g$). Low glass transition temperature is defined as $T_g$'s below room temperature. Examples of elastomers include butyl rubber, polyisobutylene, and ethylene/propylene (diene) rubber. Other suitable elastomers include polysiloxanes (e.g., polydimethylsiloxane, etc.) and poly(meth)acrylates (e.g., polybutylacrylate, polybutylmethacrylate, etc.).

Another class of polymers having elastomeric properties which are suitable for forming unreactive in situ blends with norbornene-type polymers are the hydrogenated A-B-A block copolymers of styrene-butadiene-styrene available under the KRATON® G trademark. These thermoplastic elastomers are especially attractive since they form blends with the norbornene-type polymers of this invention and are transparent due to a very small (i.e., less than the wavelength of visible light) particle size morphology.

A further embodiment of this invention is a process and composition in which an elastomer containing either pendant unsaturation or end group unsaturation is solution blended with norbornene-type monomer(s) in a suitable solvent (i.e., a solvent that dissolves the monomer and the elastomer but does not interfere with the subsequent polymerization). The norbornene-type monomer is then polymerized by addition of the above-referenced catalyst systems. In this manner a chemical bond is formed between the growing norbornene polymer and the elastomer since the above described catalysts undergo a unique chain transfer reaction forming an A-B comb or di-block copolymer. This process is referred to herein as reactive in situ blending.

Examples of suitable elastomers include butadiene and isoprene rubber, allyl-terminated polyisobutylene, or ethylene/propylene (diene) rubber, siloxanes all of which can contain either pendant or end group unsaturation. Another class of polymers having elastomeric properties which are suitable for forming reactive in-situ blends with the PNB's of this invention are the A-B-A block copolymers of styrene-butadiene-styrene available under the KRATON® D trademark. Suitable unsaturation is defined by those carbon-carbon double bonds which will undergo chain-transfer using the catalysts above described. The double bonds include vinyl groups and vinylidene groups.

A further embodiment of this invention is a process in which a terminal functional PNB macromonomer is copolymerized with an olefin using a suitable Ziegler-Natta catalyst systems to make an A-B comb block copolymer with pendant polynorbornene side blocks. A suitable terminal functional PNB includes vinyl-terminated PNB. In this case suitable olefin monomers include ethylene, propylene, butene, and longer chain alpha-olefins and mixtures thereof. Suitable Ziegler-Natta catalyst systems include titanium-based catalysts such as $TiCl_3$ in combination with diethylaluminum chloride, supported titanium catalysts such as $TiCl_4$ on $MgCl_2$ in combination with $AlEt_3$, vanadium catalysts such as $VOCl_{3-x}(OR)_x$ (where x=0-3 and R is a hydrocarbyl substituent such as methyl, ethyl, propyl, butyl, aryl, alkenyl, or alkaryl) in combination with $AlR_{3-x}Cl_x$ (where x=0-2 and R is a hydrocarbyl substituent such as methyl, ethyl, propyl, butyl, aryl, alkenyl, or alkaryl), or a metallocene-type catalyst in combination with a methaluminoxane cocatalyst or in combination with a trialkylaluminum and an activator. Suitable metallocene catalysts include those catalysts based on Group IV metals (titanium, zirconium, and hafnium) containing one or two cyclopentadienyl ligands that can be unsubstituted, substituted, bridged or unbridged. Typical examples include but are not limited to bis(cyclopentadienyl) zirconium dichloride, ethylene-bridged bis(indenyl)zirconium dichloride, dimethylsilyl-bridged bis(cyclopentadienyl) zirconium dichloride, and dimethylsilyl-bridged bis(indenyl)zirconium dichloride. Suitable activators include strong neutral Lewis acids and ionic Brønsted acids. Examples of the former activators include, but are not limited to, tris (perfluorophenyl)boron, etc. Examples of the latter class of activators include, but are not limited to N,N-dimethyl anilinium tetrakis(perfluorophenyl)borate and trityl tetrakis (perfluorophenyl)borate, etc. The metallocene catalysts may be used as unsupported or supported catalysts. Typical supports include silica or alumina.

It is further contemplated within the scope of this invention that polynorbornenes containing isobutylene-terminal functionality react with isobutylene in the presence of a suitable cationic initiator to form a comb-type A-B block copolymer with polynorbornene pendant side blocks. Suitable cationic initiators include, but are not limited to, Lewis acids such as ethylaluminum dichloride, aluminum trichloride, boron trichloride, titanium tetrachloride, etc.

It is well known that polymers can be chlorinated. Examples of commercial chlorinated polymers include chlorinated polyethylene and chlorinated polyvinylchloride. Typically, these polymers are chlorinated by addition of chlorine to the polymer in the presence of UV light or heat in solution, suspension, or in the solid state. Chlorination imparts some desirable properties to the polymers. For example, in the case of polyethylene, chlorination reduces the flammability of the material. In the case of polyvinylchloride, chlorination increases the glass transition temperature of the polymer as well as the commercially important heat distortion temperature. In addition to these properties, chlorination of the polymer changes its solubility characteristics and its compatibility with other polymers. Heretofore it has not been demonstrated that PNB can be chlorinated. In this invention we have shown that it is possible to chlorinate the polycyclic addition polymers of this invention and this is to be considered yet another embodiment of this invention. Chlorosulfonation of the polycyclic addition polymers is also contemplated in this invention. Typically this is done by addition of chlorine and sulfur dioxide or addition of sulfuryl chloride to the PNB polymer in the presence of UV light or heat.

As outlined previously, one method of compatibilizing two polymers is to add a random copolymer containing comonomer constituents that can form specific interactions with the two or more polymers to be blended. This type of strategy can be followed for the polynorbornenes of the present invention. Thus, it is a further embodiment of this invention to randomly copolymerize norbornene with selected comonomers that will allow specific interactions with two or more selected polymers to form blends and/or alloys between the two or more selected polymers. An example of this type of strategy is exemplified by the copolymerization of norbornene with 5-phenylnorbornene to form a random copolymer which in turn can be mixed with any aryl-containing (co)polymer such as polystyrene or polyα-methylstyrene. In this case the specific interactions between polystyrene and the norbornene/5-phenylnorbornene copolymer are characterized by π-π interactions between the phenyl group of the aryl-containing polymer and the phenyl group of the 5-phenylnorbornene of the norbornene copolymer. Another example may include, but is not limited to, copolymerization of norbornene with acrylate-functional norbornenes to form blends with chlorinated polymers such as polyvinylchloride. In this case, the specific interactions between the chlorinated polymers and the acrylate-functional polynorbornene is characterized as dipole-dipole. A further example may include, but is not limited to, copolymerization of acid-functional norbornenes with norbornene followed by neutralization with a base such as lithium or magnesium hydroxide to form blends with polyalkylene oxides such as polyethylene oxide or polypropylene oxide. In this case, the specific interactions between the polyalkylene oxide and the neutralized acid-functional norbornene copolymer is characterized as ion-dipole.

It is well known to those skilled in the art that maleic anhydride grafting onto polyolefins, such as polyethylene and propylene, is often performed to improve physicochemical properties of typically hydrophobic polymers to promote adhesion, dyability, and to provide functionality for other chemical modifications (see B. C. Triveldi and B. M. Culbertson, *Maleic Anhydride*, Plenum Press, New York, 1982). The grafting is typically accomplished using mechanochemical (such as extrusion), mechanochemical with free-radical initiators, free radical, ionic, and radiation-initiation techniques. Depending on the chemical nature of the polymer to be grafted a free radical, "ene" (indirect substituting addition), or Diels Alder reaction route may be employed. Grafting of maleic anhydride onto polyethylene and polypropylene using solution free radical methods typically use xylene as a solvent and benzoyl peroxide as an initiator and take place between 90° and 130° C., or use refluxing chlorobenzene (or dichlorobenzene) with benzoyl peroxide, t-butyl peroxybenzoate, or di-t-butyl peroxide. Literature also shows the subsequent reaction with amines produced detergent additives for lubricants (Shell International, Netherland Patent No. 2,969 (1965)). Typically the grafted maleic anhydride content is between 0.1 and 5 wt. %. Extrusion grafting typically occurs at typical melt extrusion temperatures for polyethylene and polypropylene (T>200° C.) and may also occur in the presence of a free radical initiator. It has been observed that maleic anhydride grafted polypropylene has shown an increased dispersability with Nylon 6 (F. Ide and A. Hasegawa, *J. Appl. Polym. Sci.*, 18(4), 963 (1974)) through reaction of the maleic anhydride moiety on the polypropylene with the nylon amino residues. Grafting has been shown to occur for a variety of polymers including polyethylene, polypropylene, ethylene propylene copolymers, polystyrene, polyvinylchloride, polyisobutylene, polyvinylacetals, polyisoprene, polybutadiene, polytetrafluoroethylene, polyacrylates, other poly-alpha-olefins and polymers containing furfuryl residues.

To our knowledge norbornene-type addition polymers have heretofore never been synthesized. We have found that the homo- and copolymeric PNBs of this invention can be reacted (through a free radical mechanism) with maleic anhydride to form grafts of succinic anhydride. The PNB/succinic anhydride graft copolymers thus prepared can be further reacted with a variety of moieties that contain coreactive functionalities with succinic anhydride.

The polycyclic polymers may be grafted with an unsaturated carboxylic acid or a derivative thereof. Examples of the unsaturated carboxylic acid used herein include acrylic acid, maleic acid, fumaric acid, tetrahydrophthalic acid, itaconic acid, citraconic acid, crotonic acid, isocrotonic acid and nadic acid (endocisbicyclo [2,2,1] hept-5-ene-2,3-dicarboxylic acid). The derivatives of the above-mentioned unsaturated carboxylic acids are unsaturated carboxylic acid anhydrides, unsaturated carboxylic acid halides, unsaturated carboxylic acid amides, unsaturated carboxylic acid imides and ester compounds of unsaturated carboxylic acids. Concrete examples of these derivatives include maleyl chloride, maleimide, maleic anhydride, citraconic anhydride, monomethyl maleate, dimethyl maleate and glycidyl maleate.

These graft monomers exemplified above may be used either singly or in combination.

Of the above-exemplified graft monomers, preferred are unsaturated dicarboxylic acids or derivaties thereof, and particularly preferred are maleic acid and nadic acid or acid anhydrides thereof.

The PNB/succinic anhydride graft copolymers of this invention can be prepared by dissolving the PNB and maleic anhydride in an appropriate solvent. Suitable solvents such as hydrocarbons, halohydrocarbons, aromatics and haloaromatics, preferred solvents are the aromatics and haloaromatics such as toluene, xylene, benzene, chlorobenzene, and o-dichlorobenzene. The reaction solution is then a sufficient amount of a suitable peroxide initiator. Suitable initiators include organic peroxides such as lauroyl peroxide, benzoyl peroxide, diacetyl peroxide, 5-butyl-peroxyneodeconate, t-butylcumyl peroxyneodecanoate, di-n-propyl peroxydicarbonate, and di-sec-butyl-peroxydicarbonate. The maleic anhydride is employed in an amount of up to about 10 percent by weight of the PNB polymer. Preferably maleic anhydride is utilized in the range of from about 0.1 to 5 percent by weight of the PNB polymer. The grafting reaction is conducted in a temperature range from about 120° C. to 220° C., preferably from 140° C. to 200° C., and most preferable from 160° C. to 180° C.

The PNB/succinic anhydride graft copolymers can be further reacted with polyamides, particularly, amine terminated polyamides, such as, for example, Nylon 66, Nylon 12, and Nylon 6. The PNB/MA-polyamide graft copolymer can be formed from solution or reactive extrusion.

In the solution process the PNB/MA graft copolymer and the polyamide (nylon) are dissolved in an appropriate solvent or mixture of solvents. The reaction medium is heated at a temperature range from about 20° C. to about 200° C., preferably about 130° C.

In the melt process the maleic anhydride, PNB polymer, and polyamide components can be reactive processed on an extruder, mill or any of the well known thermal mechanical mixing devices commonly used in the plastic compounding industry. The components react in the melt to give a PNB/succinic anhydride/polyamide graft copolymer. The temperature employed should be above the $T_g$ of the PNB, but of course should be below the degradation temperature of the PNB. It will be understood that different homo- and copolymers of PNB will have differing $T_g$'s and degradation temperatures. Typically, the temperature range employed can be from about 150° C. to about 350° C.

Other polymer resins such as amine terminated silicones, amine terminated polypropylene oxides, and amine terminated polybutadienes can be coreacted with the PNB/succinic anhydride graft copolymers of this invention, in a similar manner as discussed hereinabove.

As discussed above any functionality that is reactive with the PNB/succinic anhydride functionality can be coreacted therewith to prepare novel PNB graft copolymers. Exemplary of the coreactive functional groups that can be reacted on the PNB backbone are as follows:

| Coreactive functionality | Linkage |
| --- | --- |
| 1. Amines → amic acid and imide | |
|    A. Primary amines: | |
|       a) ethylene diamine | |
|       b) diethylene triamine | |
|       c) triethylene tetramine | |
|       d) dimethylamino propylamine | |
|       e) diethylamino propylamine | |
|    B. Secondary amines (mono, di and poly) | |
|       a) cycloaliphatic primary amines | |
|       b) cycloaliphatic secondary amines | |
|       c) cycloaliphatic polyamines | |
|       d) mono, bis and poly (hydroxyethyl) diethylene triamines amines | |
|       e) aromatic amines | |
|       f) poly(oxypropylene diamine) | |
|       g) poly(oxypropylene triamine) | |
|       h) poly(glycol amines) | |
|       i) diamine terminated poly(arylene ether sulfones) | |
|       j) diamine terminated poly(arylene ether ketones) | |
|       k) mono and diamine terminated polyamides | |
| 2. Alcohols → mono and diesters | |
|    A. aliphatic alcohols (mono and di) | |
|    B. aromatic alcohols (mono and di) | |
| 3. Thiols → mono and di thio esters | |
|    A. aliphatic mercaptans (mono and di) | |
|    B. aromatic thiols (mono and di) | |
| 4. Water → diacid | |

The following examples will show one skilled in the art how to operate the scope of the present invention and are not intended to serve as a limitation on the scope hereof.

EXAMPLE 1

Synthesis of Vinyl-terminated PNB Copolymer of Norbornene/decylnorbornene Copolymer Norbornene (82.5 g) and 5-decylnorbornene (27.5 g) were dissolved in 1.17 l of dried dichloroethane. This mixture was degassed and added to a 2 l stainless steel reactor. The mixture was cooled to 10° C. and saturated with ethylene at 125 psig. A dichloroethane solution of [(crotyl)Ni(COD)][PF$_6$] (0.091 g) was added to the mixture. The reaction was allowed to continue for 1.25 h. The reaction was terminated by releasing the ethylene pressure and injecting ethanol into the reactor. The polymer was isolated by pouring the reaction mixture into ethanol, filtered, and dried (yield 38.5 g). The molecular weight of the isolated polymer was determined by GPC: $M_w$=4750 and $M_n$=3000. NMR analysis of the material showed that it contained vinyl end groups with resonances at about 5.7 (1 H) and 4.7 ppm (2 H).

EXAMPLE 2

Synthesis of Vinyl-terminated PNB Homopolymer

Norbornene (150 g) was dissolved in 1500 ml of dried dichloroethane. This mixture was degassed and added to a 2 l stainless steel reactor. The mixture was cooled to 10° C. and saturated with ethylene at 250 psig. A dichloroethane solution of [(crotyl)Ni(COD)][PF$_6$] (0.146 g) was added to the mixture. Within 10-15 min, the reaction exothermed to at least 80° C. After terminating the reaction, considerable polymer had precipitated and was isolated by filtration, then dried (yield 55.4 g, fraction –1). The filtrate was added to MeOH and more precipitate formed (yield 38.3 g, fraction –2). This filtrate was then added to more MeOH and yet more precipitate formed (yield 11.2 g, fraction –3). Each fraction was determined by proton NMR to contain vinyl end groups. The molecular weight of each fraction was also determined by GPC: fraction –1: $M_w$=3080 and $M_n$=1800; fraction –2: $M_w$=1660 and $M_n$=1250; fraction –3: $M_w$=970 and $M_n$=820.

EXAMPLE 3

Synthesis of an Isobutylene-terminated PNB

The isobutylene-terminated polynorbornene was synthesized in the following manner. Norbornene (5 g) was added to a 100 ml vial equipped with a stir bar, then crimp capped with a septum. To this was added 50 ml of dried dichloroethane. The solution was degassed, cooled to –30° C. and isobutylene (5.0 g) was added. To this solution was added 0.01 ml nickel (II) ethylhexanoate (8% Ni) followed by 1 ml of 0.125M solution of N,N-dimethylanilinium tetraperfluorophenyl borate in dichloroethane and 0.38 ml of a 1.7M solution of triethylaluminum in toluene. The mixture was stirred for an hour at –30° C. The resulting slurry was poured into MeOH, filtered, and dried at 80° C. under vacuum overnight. Yield 4.6 g. GPC: $M_w$=9800, $M_n$=4200.

EXAMPLE 4

Formation of Alcohol-terminated PNB Copolymer of Norbornene/decylnorbornene

Into a round bottom flask was added 1.0 g of a vinyl-terminated norbornene/decylnorbornene copolymer (from Example 1). This was dissolved in 50 ml of dried, degassed THF. To this mixture was added 6.7 ml of a 0.5M THF solution of 9-borobicyclo[3.3.1]nonane (9-BBN). The solution was refluxed for 1.5 h under an Ar atmosphere and cooled overnight. Water (5 ml) was carefully added to the flask. Another 5 ml of NaOH (3M in water) was added followed by 20 ml hydrogen peroxide (30%). The solution was transferred to a separator funnel and washed with a saturated aqueous solution of $K_2CO_3$ (10 ml). The THF layer was separated from the aqueous layer and the polymer was isolated from the THF layer by precipitation into MeOH. The polymer was dried at 80° C. under vacuum. The formation of an alcohol-terminated norbornene/decylnorbornene copolymer was confirmed by $^1$H NMR spectroscopy. The methylene resonances adjacent to the terminal hydroxyl functionality resonate at 3.7 ppm. These assignment of these resonances was confirmed by reaction with $Cl_3CNCO$ which yielded an upfield shift to 4.2 ppm.

EXAMPLE 5

Formation of Alcohol-terminated Norbornene Homopolymer

Into a round bottom flask was added 10 g of a vinyl-terminated norbornene homopolymer (from Example 2). This was dissolved in 150 ml of dried, degassed THF. To this mixture was added 61.2 ml of a 0.5M THF solution of 9-borobicyclo[3.3.1]nonane (9-BBN). The solution was refluxed for 1.5 h under an argon atmosphere and cooled overnight. Water (25 ml) was carefully added to the flask.

Another 25 ml of NaOH (3M in water) was added followed by 60 ml of hydrogen peroxide (30%). More THF was added until two layers formed. The solution was transferred to a separator funnel and washed with a saturated aqueous solution of $K_2CO_3$ (150 ml). The mixture was allowed to separate over several hours. The THF layer was separated from the aqueous layer and the polymer was isolated by precipitation into MeOH (1000 ml). The polymer was filtered and dried at 80° C. under vacuum. The formation of an alcohol-terminated norbornene homopolymer was confirmed by $^1H$ NMR spectroscopy. The methylene protons adjacent to the terminal hydroxyl group resonate at 3.7 ppm.

EXAMPLE 6

This example shows that maleic anhydride can be incorporated on the end of an isobutylene-terminated PNB to give an allyl succinic anhydride terminal functionality.

Formation of an allyl succinic anhydride-terminated PNB by reaction of a isobutylene-terminated PNB with maleic anhydride. An isobutylene-terminated polynorbornene (0.050 g) and maleic anhydride (0.0012 g) were dissolved in deuterated ortho-dichlorobenzene, placed into an NMR tube and heated to 200° C. overnight. The vinylidene proton resonances of the isobutylene-terminated polynorbornene were replaced by protons of the allyl succinic anhydride group (5.30 and 5.15 ppm).

EXAMPLE 7

Formation of an Aldehyde-terminated PNB from the Hydroformylation of an Isobutylene-terminated PNB Isobutylene-terminated polynorbornene (from Example 3) (1.0 g) was dissolved in 20 ml of toluene and then degassed with argon. Irgafos, $(P(O(2,5-t-Bu)C_6H_3)_3$, (0.06 g) and $[Rh(1,5-COD)(acetate)]_2$ (0.0023 g) were each dissolved in 10 ml dried, degassed toluene. The three solutions were then transferred into a stainless steel reactor. The reactor was pressurized with 300 psig synthesis gas (equimolar CO and $H_2$) and heated to 80° C. The reactor was vented and repressurized for the first 3-4 h. The reaction was continued for 48 h. After cooling, a 5 ml aliquot of the resulting golden brown solution was poured into acetone to precipitate the polymer. The white powder was filtered and dried. IR analysis of the polymer indicated the formation of an aldehyde end group since a CO stretch was observed at about 1660 $cm^{-1}$.

EXAMPLE 8

Synthesis of Epoxy-terminal PNB

Vinyl-terminated PNB (fraction 1 from Example 2, above) (20 g) was dissolved in toluene (100 ml). To this mixture was added 3-chloroperoxybenzoic acid (11.4 g). After stirring the mixture, the polymer was precipitated into MeOH. Proton NMR analysis of the resulting polymer, showed no vinyl resonances present. New resonances appeared at 2.8 to 3.0 ppm and are assigned to those protons adjacent to the epoxide functionality.

EXAMPLE 9

This example exemplifies the reaction of alcohol-terminated PNB with the isocyanate MDI (methylene diphenyl diisocyanate) as a reaction for incorporation of the alcohol-terminated PNB into a polyurethane formulation.

Reaction of an Alcohol-terminated PNB with MDI

Two equivalents of an alcohol-terminated norbornene/decylnorbornene copolymer (from Example 2) were reacted with MDI (0.02 g, MW=250) in deuterated-tetrachloroethane in an NMR tube for 1 h at 80° C. Formation of a urethane linkage was confirmed by $^1H$ NMR spectroscopy; the methylene protons adjacent to the hydroxy-end group shifted from 3.7 ppm to 4.2 ppm.

EXAMPLE 10

Reaction of an Epoxy-terminated PNB with a Difunctional Acid-terminated Polybutadiene (A-B-A block copolymer)

Epoxy-terminated PNB (0.03 g, from Example 7) and carboxylic acid-terminated polybutadiene (HYCAR® CTB 2000X 162, 0.052 g, $M_w$=2375) was dissolved in 30 ml of toluene. The solution was degassed with argon. To this solution was added 8.5 microliters of 1,8-diazabicyclo[5.4.0]undec-7-ene as a catalyst. The mixture was heated to 80° for 24 hours. From $^1H$ NMR analysis of the product, it was apparent that the epoxy functionality had reacted; the intensity of protons of the epoxide at 2.85 ppm decreased markedly and was replaced by new signals at 3.40 ppm. These signals are assigned to the methylene protons vicinal to the hydroxy and the ester functionality.

EXAMPLE 10A

Reaction of an Epoxy-terminated PNB with a Difunctional Acid-terminated Polybutadiene (ABA Block Copolymer)

Epoxy-terminated PNB (0.2 g, from Example 8) and carboxylic acid-terminated polybutadiene (HYCAR® CTB 2000X 162, 0.20 g, $M_w$=2375) was dissolved in 30 ml of toluene. The solution was degassed with argon. To this solution was added 1.7 microliters of 1,8-diazabicyclo[5.4.0]undec-7-ene as a catalyst. The mixture was heated to 80° C. overnight. From $^1H$ NMR analysis of the product, it was apparent that the epoxy functionality had reacted; the intensity of protons of the epoxide at 2.85 ppm decreased markedly and was replaced by new signals at 3.4-3.5 ppm. These signals are assigned to the methylene protons vicinal to the hydroxy and the ester functionality.

EXAMPLE 11

Control Experiment for Example 13

Norbornene polymerization in absence of chain transfer agent.

Norbornene (2.0 g) was dissolved in 30 ml of dichloroethane. The solution was degassed with argon. To this solution was added $[(crotyl)Ni(COD)]PF_6$ (0.0039 g). The polymerization was allowed to run for one hour and then was terminated by addition to MeOH. The polymer was isolated by pouring the reaction mixture into an excess of MeOH. The resulting solid was filtered and dried. Yield 1.62 g. GPC analysis of the product showed an $M_w$=1,270,000 and $M_n$=558,000.

EXAMPLES 12-13

These examples show the utility of an allyl-terminated macromolecule (namely polyisobutylene) as a chain-transfer agent and as a coreactant to make A-B block copolymers.

EXAMPLE 12

Synthesis of Allyl-terminated Polyisobutylene (PIB)

Hexane (70 g) and methylchloride (70 g) were transferred to a reaction vessel and cooled with a dry ice/isopropanol bath. 2,6-di-tert-butylpyridine (0.5 ml), 2,4,4,-trimethyl-2-chloropentane (0.23 g), and titanium tetrachloride (3.29 g) were added to the reaction flask. Isobutylene (16 g) was transferred to the reaction vessel. The mixture was stirred for 30 min after which time pre-chilled allyltrimethylsilane (3.5 g) was added and stirred for an additional 30 min. The vessel contents were then poured into saturated aqueous sodium bicarbonate and the volatiles were allowed to evaporate. The organic layer was separated and washed three times with water. The polymer was precipitated into acetone. The acetone was decanted and the residue was dissolved in hexane. The hexane was removed in vacuo to yield a solid. Yield 15.2 g. GPC determined the $M_w$ to be 16,000 and $M_n$ to be 14,500.

EXAMPLE 13

Synthesis of PNB-PIB Block Copolymer

Allyl-terminated polyisobutylene (2.6 g, from synthesis above) and norbornene (2 g) was dissolved in 30 ml of dichloroethane. The solution was degassed with argon. To this solution was added [(crotyl)Ni(COD)]$PF_6$ (0.0039 g). The polymerization was allowed to run for one hour and then was terminated by addition to MeOH. The polymer was isolated by pouring the reaction mixture into an excess of MeOH. The resulting solid was filtered and dried. Yield 2.87 g. The GPC trace was bimodal: $M_w$=17,300, $M_n$=15,900 and $M_w$=300,000, $M_n$=169,000. Based on the values of the lower molecular weight fraction, this material is unreacted allyl-terminated PIB.

The polymer product was subjected to Soxhlet extraction using methylene chloride solvent. The soluble portion was found to be unreacted allyl-terminated polyisobutylene by NMR. The insoluble portion was found to contain polyisobutylene and polynorbornene resonances by NMR, but no allyl end groups were present indicating that a block copolymer was formed. The GPC molecular weight of the methylene chloride insoluble portion gave an $M_w$=345,000 and an $M_n$=164,000. The lower molecular weight of this material, relative to the control PNB (Example 11), is consistent with the allyl-terminated PIB being a macromolecular chain transfer agent.

EXAMPLE 14

The following example exemplifies the synthesis of PNB copolymers containing pendant unsaturation.

All reactions were carried out in glass flasks under an inert atmosphere using dried and degassed dichloroethane. Dichloroethane was added to the reaction flask, followed by the monomers set forth in the table below. The reaction mixture was degassed with nitrogen. The nickel (II) ethylhexanoate catalyst was added as a solution in dichloroethane. Then the trialkylaluminum cocatalyst (either triethyl- or triisobutyl-aluminum) was added as a toluene solution. Then neat hexachloroacetone was added to the mixture. The reaction was carried out for approximately 1 hour. MeOH (typically 5 ml) was added to terminated the reaction. The mixture was then added to an excess of MeOH (typically a 3:1 ratio) to isolate the polymer. The polymer was then filtered, washed with MeOH, and dried. See the table below for details of each polymerization run.

| Experiment No. | [NB] (g) | [Comonomer]* (g) | Monomers:Ni (molar) | Ni:Al:H CA** | Conv (%) | Mw (×10$^{-3}$) | Mn (×10$^{-3}$) | Comments |
|---|---|---|---|---|---|---|---|---|
| 1 | 136 | ENB(58) | 2500:1 | 1:10:10 | 50 | 136 | 35 | Al = triisobutylaluminum |
| 2 | 85 | ENB(109) | 2500:1 | " | 35 | 94.5 | 24 | " |
| 3 | 136 | ENB(58) | 2500:1 | " | 61 | 129 | 32 | " |
| 4 | 136 | ENB(58) | 2500:1 | " | 54 | 107 | 33 | " |
| 5 | 183 | — | 2500:1 | " | 80 | 100 | 45.7 | Al = triethylaluminum |
| 6 | 85 | ENB(109) | 2500:1 | " | 24 | 70 | 19.1 | Al = triisobutylaluminum |
| 7 | 136 | ENB(58$^1$) | 2500:1 | " | 67 | 61 | 21 | " |
| 8 | 85 | ENB(109$^1$) | 2500:1 | " | 31 | 45 | 19 | " |
| 9 | 136 | ENB(58) | 2500:1 | " | 50 | 145 | 36 | " |
| 10 | 85 | ENB(109) | 2500:1 | " | 26 | 61 | 18.4 | " |
| 11 | 136 | ENB(58$^2$) | 2500:1 | " | 54 | 124 | 30 | " |
| 12 | 85 | ENB(109$^2$) | 2500:1 | " | 30 | 45 | 19 | " |

*ENB = ethylidene norbornene
$^1$= with 3 mol % decene-1 relative to monomers
$^2$= with 1 mol % decene-1 relative to monomers
**= HCA = hexachloroactone

EXAMPLE 15

The following example exemplifies the synthesis of PNB copolymers containing pendant unsaturation.

Preparation of Nickel Catalyst

In the dry box, 0.2 ml of $HSbF_6$ is added to a dried Teflon® vial. The vial is cooled. An equimolar amount of nickel (II) ethylhexanoate (3.15 ml, 8 wt % Ni) is added to the vial, warmed to room temperature and stirred for 2 hours. The mixture is stored at −20° C. before use.

Polymerization Procedure

All reactions were carried out in glass flasks under an inert atmosphere using dried and degassed dichloroethane. Dichloroethane was added to the reaction flask, followed by the monomers set forth in the table below. The reaction mixture was degassed with nitrogen. The nickel catalyst (as prepared above) was added to the mixture. Then $BF_3.Et_2O$, followed by triethylaluminum in toluene solution. The reaction was carried out for approximately 1 hour. MeOH (typically 5 ml) was added to terminated the reaction. The mixture was then added to an excess of MeOH (typically a 3:1 ratio) to isolate the polymer. The polymer was then filtered, washed with MeOH, and dried.

| Experiment No. | [NB] (g) | [Comonomer]* (g) | Monomers:Ni (molar) | Ni:Sb:B:Al | Conv (%) | Mw (×10⁻³) | Mn (×10⁻³) | Comments |
|---|---|---|---|---|---|---|---|---|
| 1 |  | decyl-NB, 186 | 4000:1 | 1:1:9:10 | 58 | — | — | Al = triethylaluminum |
| 2 | 85 | VNB, 109 | " | " | 3 | 6.2 | 3 | " |
| 3 | 82 | DCPD, 116 | " | " | 18 | 92 | 13.3 | " |
| 4 | 82 | DCPD, 116² | " | " | 27 | — | — | " |
| 5 |  | 2.5 CyNB, 4.6 | " | " | 28 | — | — | " |

*VNB = vinyl norbornene, DCPD = dicyclopentadiene, CyNB = cyclohexenylnorbornene
²with 1 mol % decene-1 relative to monomers

EXAMPLE 16

This example demonstrates the epoxidation of terminal and pendant unsaturated groups of PNB polymers.

Epoxidation Procedure

The polymers listed in the table below were dissolved in toluene (typically 10 wt %). (If needed, an equal amount of chloroform was added to the mixture to aid in solubility.) Typically, a 1.1 molar ratio of 3-chloroperoxybenzoic acid (50%) to the number of double bonds in the polymer was added to the toluene solution. The reaction was allowed to continue stirring overnight. The polymer was isolated by pouring the reaction mixture to an excess of MeOH, filtered, washed with additional MeOH, and dried. If by NMR assay showed incomplete epoxidation has occurred, the epoxidation is carried out once again as described above. Determination of full epoxidation relies on disappearance of the double bond resonances associated with the incorporated diene monomer (ENB: 4.8-5.5 ppm; VNB: 4.8-6.0 ppm; DCPD: 5.5-6.0 ppm; CyNB: 5.4-5.7 ppm) or the vinyl-terminated polymers (approximately 5.5-6.0 and 4.8-5.0 ppm). If m-chloro benzoic acid impurities are present in the polymer (as determined by NMR), the polymer is reprecipitated from toluene solution with MeOH until no residual m-chloro benzoic acid is detectable by NMR.

| Experiment No. | Polymer Starting Material | M$_w$(×10⁻³) | M$_n$(×10⁻³) |
|---|---|---|---|
| 1 | VT-NB + NB10 | — | — |
| 2 | NB/ENB 50/50 | 60 | 20 |
| 3 | NB/ENB 75.25 | 113 | 39 |
| 4 | DT-NB/ENB 75/25 | 63 | 17 |
| 5 | VT-PNB | 3.5 | 2.3 |
| 6 | DT-NB/ENB 50/50 | 45 | 22 |
| 7 | DT-NB/ENB 75/25 | 165 | 46 |
| 8 | NB/ENB 50/50 | 52 | 17.5 |
| 9 | DT-NB/ENB 50/50 | 44 | 18.3 |
| 10 | VT-PNB | 7 | 3.9 |
| 11 | NB/VNB 50/50 | 7.9 | 4.9 |
| 12 | NB/DCPD 50/50 | — | — |
| 13 | NB/CyNB 50/50 | 75.1 | 20.8 |

VT = vinyl terminated
NB = norbornene
ENB = ethylidene norbornene
DT = decenyl terminated
NB10 = decyl norbornene
DCPD = dicyclopentadiene
CyNB = cyclohexyl norbornene

EXAMPLE 17

These examples show that the polymers made in Example 12 above can find utility in blends with CPVC.

Solution blends of CPVC and epoxidized PNB copolymers (containing terminal and pendent epoxy groups) were prepared in a mixed solvent system of 1,2-dichloroethane/THF (2:1 v/v). A 2.0% by weight solution of the blend compositions was prepared and warmed to 50° C. overnight to insure complete dissolution and mixing of components. Solution blends of CPVC and epoxidized vinyl-terminated norbornene polymers were prepared in a mixed solvent system of THF/cyclohexane (1:1 v/v). A 2.0% by weight solution of the blend compositions was prepared and warmed to 50° C. overnight to insure complete dissolution and mixing of components.

Solvent-cast films used for evaluation were prepared by applying three coats of the solutions onto clean glass microscope slides with an eye dropper. Films were then dried in an air oven at 60° C. for 2 hours. Further drying, to remove residual solvent, was done by placing the slides in a vacuum oven at 80° C. overnight.

Blend morphology was determined using both light and scanning electron microscopic techniques. Light micrographs were obtained at 700× magnification and SEM at 2,500× and 1,000× magnification.

Blends of CPVC (I.V.=0.68) with epoxidized NB/ENB obtained from Example 16, experiment 2, copolymer (50/50).

The results are set forth in the table below:

| Experiment No. | Blend Ratio (67% CPVC*F-PNB) | Light Microscopy | SEM Observation |
|---|---|---|---|
| 1 | 100/0 | 1 phase | 1 phase |
| 2 | 80/20 | 1 phase | 1 phase |
| 3 | 50/50 | 1 phase | 1 phase |
| 4 | 20/80 | 1 phase | 1 phase |
| 5 | 0/100 | 1 phase | 1 phase |

F-PNB = functional PNB
*67% chlorine by wt.

| Experiment No. | Blend Ratio (70% CPVC**F-PNB) | Light Microscopy | SEM Observation |
|---|---|---|---|
| 1 | 100/0 | 1 phase | 1 phase |
| 2 | 80/20 | 1 phase | 1 phase |
| 3 | 50/50 | 1 phase | 1 phase |
| 4 | 20/80 | 1 phase | 1 phase |

F-PNB = functional PNB
**70% chlorine by wt.

EXAMPLE 18

Blends of CPVC (I.V.=0.68) with epoxidized vinyl-terminated polynorbornene obtained from Example 16, experiment 10. Solution blends of CPVC and epoxidized PNB copolymers were prepared and tested as in Example 17. The results are set forth in the table below:

| Experiment No. | Blend Ratio (67% CPVC*F-PNB) | Light Microscopy | SEM Observation |
| --- | --- | --- | --- |
| 1 | 100/0 | 1 phase | 1 phase |
| 2 | 0/100 | 1 phase | 1 phase |
| 3 | 98/2 | 1 phase | — |
| 4 | 96/4 | 1 phase | — |
| 5 | 90/10 | 1 phase | — |
| 6 | 70/30 | 2 phase | 2 phase |
| 7 | 50/50 | 2 phase | 2 phase |

*F-PNB = functional PNB
*67% chlorine by wt.

EXAMPLE 19

Blends of CPVC (I.V.=0.68) with epoxidized NB/DCPD copolymer (50/50) obtained from Example 16, experiment 12. Solution blends of CPVC and epoxidized PNB copolymers were prepared and tested as in Example 17. The results are set forth in the table below:

| Experiment No | Blend Ratio (67% CPVC*F-PNB) | Light Microscopy | SEM Observation |
| --- | --- | --- | --- |
| 1 | 100/0 | 1 phase | — |
| 2 | 80/20 | 1 phase | — |
| 3 | 50/50 | 1 phase | — |
| 4 | 20/80 | 2 phase | 2 phase |
| 5 | 0/100 | 1 phase | 1 phase coarse |

F-PNB = functional PNB
*67% chlorine by wt.

EXAMPLE 20

Blends of CPVC (I.V.=0.68) with epoxidized NB/VNB copolymer (50/50) obtained from Example 16, experiment 11. Solution blends of CPVC and epoxidized PNB copolymers were prepared and tested as in Example 17. The results are set forth in the table below:

| Experiment No. | Blend Ratio (67% CPVC*F-PNB) | Light Microscopy | SEM Observation |
| --- | --- | --- | --- |
| 1 | 80/20 | 1 phase | — |
| 2 | 70/30 | 1 phase | — |
| 3 | 50/50 | 1 phase | 1 phase |
| 4 | 0/100 | 1 phase | 1 phase |

F-PNB = functional PNB
*67% chlorine by wt.

EXAMPLE 21

This example demonstrates the free radical grafting of a vinyl-type polymer onto a non-functional PNB.

Into a two necked, 100 ml round bottom flask fitted with a overhead mechanical stirrer and an argon inlet, 1.0 g ($5 \times 10^{-6}$ moles) of polynorbornene ($M_w$=200,000 g/mole) was added under argon atmosphere. To this 9.0 g (0.086 moles) of freshly distilled styrene and 0.05 g of di t-butyl peroxide were added. The solution was diluted with 10 ml of chlorobenzene, stirred until all the PNB had dissolved and slowly heated to about 120° C. The reaction was stirred for about 5 hours, during which time the solution's viscosity was observed to increase considerably. After 5 hours, the polymer solution was cooled, diluted with toluene and precipitated into methanol to obtain a white polymer, which was dried at 100° C. in a vacuum oven. In order to obtain information on the grafting efficiency, pure graft copolymers had to be isolated. It was found that by dissolving part of these samples, followed by centrifuging the samples, PNB graft copolymers can be separated from polystyrene homopolymers, as the PNB graft copolymer is not soluble in tetrahydrofuran while the polystyrene was. Such extraction of the graft samples were performed three times on all the samples. $^1$H NMR analysis of the tetrahydrofuran insoluble polymer indicated the presence of aromatic protons at 6.4 ppm and 7.2 ppm corresponding to the polystyrene and broad aliphatic protons appearing around 1-2.5 ppm corresponding to the norbornene polymer. Also films of the tetrahydrofuran insoluble material, cast from cyclohexane were observed to be clear and transparent. The clear film obtained from the tetrahydrofuran insoluble material followed by the presence of styrene protons from proton NMR are a clear evidence for grafting of styrene on to polynorbornene polymers.

EXAMPLE 22

This example demonstrates the free radical grafting of a vinyl-type polymer onto a PNB having pendant unsaturation.

Into a two necked, 100 ml round bottom flask fitted with a magnetic stirrer and an argon inlet, 4.55 g (0.189 mmoles) of polynorbornene/ethylidene norbornene (PNB/ENB) copolymer containing 50 mole % of ethylidene norbornene was added under argon atmosphere. To this 13.6 g (0.131 moles) of freshly distilled styrene and 5.9 mg (0.029 mmoles) of dodecanethiol were added. The solution was further diluted with 5 ml of chlorobenzene and stirred until all the PNB/ENB copolymer had dissolved. The solution was slowly heated to about 120° C. at which point 0.018 g (0.066 mmoles) of dicumyl peroxide was added. After the addition of the peroxide the solutions viscosity was observed to increase and after about 3 hours the viscosity of the solution was so high that stirring was observed to be difficult. The reaction was stopped, diluted with toluene and precipitated into methanol to obtain a white polymer, which was dried at 60° C. in a vacuum oven. $^1$H NMR analysis of the polymer indicated the presence of aromatic protons at 6.4 ppm and 7.2 ppm corresponding to the polystyrene and broad aliphatic protons appearing around 1-2.5 ppm corresponding to the norbornene polymer. A small sample of the polymer was dissolved in chlorobenzene and films casted from the solution was observed to be clear. It is to be noted that film cast from chlorobenzene of high molecular weight polystyrene and polynorbornene polymers were observed to be opaque indicating phase separated morphology. The appearance of the clear film in the case of polymerization of styrene in the presence of PNB/ENB copolymer indicates that styrene is grafting on to PNB/ENB copolymer.

EXAMPLE 23

This example illustrates the free radical polymerization of a vinyl-type monomer in the presence of a PNB and polymeric impact modifier.

Into a two necked, 100 ml round bottom flask fitted with a overhead mechanical stirrer and an argon inlet, 1.0 g ($5 \times 10^{-6}$ moles) of polynorbornene $M_w$=200,000 g/mole was added under argon atmosphere. To this 4.5 g (0.043 moles)

of freshly distilled styrene and 0.3 g of styrene butadiene styrene copolymer (Cariflex® TR 1102) was added. The solution was diluted with 10 ml of chlorobenzene, stirred until all the PNB had dissolved and slowly heated to about 90° C. The reaction was stirred for about 12 hours, during which time the solutions viscosity was observed to increase considerably. After 12 hours, 0.05 g of di t-butyl peroxide was added followed by another 4.5 g of styrene monomer to the reaction flask. The flask was further heated to 150° C. for 3 hours, cooled, further diluted with toluene and precipitated into methanol to obtain a white polymer, which was dried at 100° C. in a vacuum oven. Films cast from the rubber modified material was observed to be translucent indicating phase separated morphology.

These Examples illustrate in situ blends of PNB polymers with reactive and unreactive elastomers.

EXAMPLE 24

Copolymerization of Norbornene and 5-decylnorbornene to Generate in Situ Blend with KRATON® G 1652

To a 50 ml glass vial containing a magnetic stir bar and a mixture of norbornene and 5-decylnorbornene (75/25 mol/mol, 53 mmol total norbornenes) was added cyclohexane containing varying levels of a dissolved rubber (KRATON® G 1652, the solution having been dried over molecular sieves and purged with nitrogen) followed by nickel ethylhexanoate (0.013 mmol) and ethylaluminum dichloride (0.065 mmol). After one hour ethanol was injected to the solution to terminate the reaction. The polymer blend was then precipitated with excess ethanol and was washed with excess acetone, filtered and dried overnight, under vacuum at 80° C. The polymer yields are tabulated below:

| Cyclo-hexane, ml. | Rubber, g | Total yield, g | Yield of polynor-bornene (total-rubber), g | $M_w$ | $M_n$ | Comments |
|---|---|---|---|---|---|---|
| 35 | 1.5 | 7.1 | 5.6 | 327,000 | 104,000 | bimodal MWD (shoulder) |
| 17.5 | 0.75 | 6.5 | 5.75 | 292,000 | 109,000 | bimodal MWD (shoulder) |

EXAMPLE 25

Homopolymerization of Norbornene to Generate in Situ Blend with KRATON® G 1652

To a 50 ml glass vial containing a magnetic stir bar and norbornene (5 g, 53.1 mmol) was added cyclohexane containing varying levels of a dissolved rubber (KRATON® G 1652, the solution having been dried over molecular sieves and purged with nitrogen) followed by nickel ethylhexanoate (0.013 mmol) and ethylaluminum dichloride (0.065 mmol). After one hour ethanol was injected to the solution to terminate the reaction. The polymer blend was then precipitated with excess ethanol and was washed with excess acetone, filtered and dried overnight, under vacuum at 80° C. The polymer yields are tabulated below:

| Cyclo-hexane, ml. | Rubber, g | Total yield, g | Yield of polynor-bornene (total-rubber), g | $M_w$ | $M_n$ | Comments |
|---|---|---|---|---|---|---|
| 7.5 | 0.3 | 5.2 | 4.9 | 272,000 | 79,000 | |
| 35 | 1.5 | 6.3 | 4.8 | 393,000 | 75,900 | bimodal MWD (shoulder) |

EXAMPLE 26

This example demonstrates using a polymer with pendant vinyl groups as chain transfer agent by dissolving the polymer in the hydrocarbon polymerization medium and running a solution and/or suspension polymerization to give a graft copolymer.

Polymerization of norbornene in the presence of polybutadiene to generate in situ grafts, as well as to control molecular weight.

To a 50 ml glass vial containing a magnetic stir bar and 5.0 g (53.1 mmol) of norbornene was added 20 ml dichloroethane and 11 g of a 9.1 weight % solution of polybutadiene with an $M_n$ of 5,000 and a vinyl content of 20%, in dichloroethane (that had been dried over molecular sieves and purged with nitrogen) followed by catalyst component "A" (see Example 35) (0.013 mmol), $BF_3$.etherate (0.117 mmol) and triethylaluminum (0.130 mmol). After one hour ethanol was injected to the solution to terminate the reaction. The polymer was then precipitated with excess ethanol and was washed with excess acetone, filtered and dried overnight, under vacuum at 80° C. The polymer was isolated in 85% yield (5.1 g). GPC methods revealed the graft copolymer to possess an $M_n$ of 32,000 and an $M_w$ of 59,000.

Comparative Experiment

This control experiment was run under similar conditions to the above illustrative example except that the experiment was run in the absence of the polybutadiene, resulting in no chain transfer or grafting and an extremely high molecular weight.

To a 100 ml glass vial containing a magnetic stir bar and 5.0 g (53.1 mmol) of norbornene was added 80 ml dichloroethane followed by catalyst component "A" (see Example 35) (0.026 mmol), $BF_3$.etherate (0.234 mmol) and triethylaluminum (0.260 mmol). After one hour ethanol was injected to the solution to terminate the reaction. The polymer was then precipitated with excess ethanol and was washed with excess acetone, filtered and dried overnight, under vacuum at 80° C. The polymer was isolated in quantitative yield. GPC methods revealed the homopolymer to possess an $M_n$ of 340,000 and an $M_w$ of 1,650,000.

EXAMPLE 27

To a 50 ml glass vial containing a magnetic stir bar and 5.0 g (53.1 mmol) of norbornene was added 35 ml dichloroethane and 1.55 g of a 9.1 weight % solution of polybutadiene with an $M_n$ of 5,000 and a vinyl content of 20%, in dichloroethane (that had been dried over molecular sieves and purged with nitrogen) followed by catalyst component "A" (see Example 35) (0.013 mmol), $BF_3$.etherate (0.117 mmol) and triethylaluminum (0.130 mmol). After one hour ethanol was injected to the solution to terminate the reaction.

The polymer was then precipitated with excess ethanol and was washed with excess acetone, filtered and dried overnight, under vacuum at 80° C. The graft copolymer was isolated in 95% yield. GPC methods revealed the graft copolymer to possess an $M_n$ of 71,000 and an $M_w$ of 183,000.

EXAMPLE 28

To a 50 ml glass vial containing a magnetic stir bar and 5.0 g (53.1 mmol) of norbornene was added 7.5 g of a 3.0 weight % solution of Diene 55® in cyclohexane (that had been dried over molecular sieves and purged with nitrogen) followed by nickel ethylhexanoate (0.026 mmol) and ethylaluminum dichloride (0.27 mmol). After one hour ethanol was injected to the solution to terminate the reaction. The graft copolymer was then precipitated with excess ethanol and was washed with excess acetone, filtered and dried overnight, under vacuum at 80° C. The polymer was isolated in 84% yield (4.2 g). GPC methods revealed the graft copolymer to possess an $M_n$ of 121,000 and an $M_w$ of 529,000.

EXAMPLE 29

To a 50 ml glass vial containing a magnetic stir bar and 2.5 g (26.5 mmol) of norbornene was added 20 ml cyclohexane and 10.0 g of a 10.0 weight % solution of polybutadiene with an $M_n$ of 5,000 and a vinyl content of 20%, in cyclohexane (that had been dried over molecular sieves and purged with nitrogen) followed by nickel ethylhexanoate (0.013 mmol) and methylaluminoxane (163 mmol). After one hour ethanol was injected to the solution to terminate the reaction. The polymer was then precipitated with excess ethanol and was washed with excess acetone, filtered and dried overnight, under vacuum at 80° C. to afford the product (1.5 g). GPC methods revealed the graft copolymer to possess an $M_n$ of 13,400 and an $M_w$ of 24,700.

EXAMPLE 30

To a 50 ml glass vial containing a magnetic stir bar and 2.5 g (26.5 mmol) of norbornene was added 20 ml dichloroethane and 11.0 g of a 9.1 weight % solution of polybutadiene with an $M_n$ of 5,000 and a vinyl content of 20%, in dichloroethane (that had been dried over molecular sieves and purged with nitrogen) followed by nickel ethylhexanoate (0.013 mmol), N,N-dimethyl anilinium tetra (perfluorophenyl)borate (0.013 mmol) and triethylaluminum (650 mmol). After one hour ethanol was injected to the solution to terminate the reaction. The polymer was then precipitated with excess ethanol and was washed with excess acetone, filtered and dried overnight, under vacuum at 80° C. to afford the product (2.6 g). GPC methods revealed the graft copolymer to possess an $M_n$ of 27,000 and an $M_w$ of 44,000.

EXAMPLE 31

To a 50 ml glass vial containing a magnetic stir bar and 5.0 g (53.1 mmol) of norbornene was added 20 ml dichloroethane and 11.0 g of a 9.1 weight % solution of polybutadiene with an $M_n$ of 5,000 and a vinyl content of 20%, in dichloroethane that had been dried over molecular sieves and purged with nitrogen) followed by nickel ethylhexanoate (0.013 mmol), N,N-dimethyl anilinium tetra (perfluorophenyl)borate (0.013 mmol) and triethylaluminum (650 mmol). After one hour ethanol was injected to the solution to terminate the reaction. The polymer was then precipitated with excess ethanol and was washed with excess acetone, filtered and dried overnight, under vacuum at 80° C. to afford the graft copolymer (4.1 g) which was found by GPC methods to possess an $M_n$ of 39,000 and an $M_w$ of 65,000.

EXAMPLE 32

To a 50 ml glass vial containing a magnetic stir bar and 5.0 g (53.1 mmol) of norbornene was added 20 ml cyclohexane and 10.0 g of a 10.0 weight % solution of polybutadiene with an $M_n$ of 5,000 and a vinyl content of 20%, in cyclohexane (that had been dried over molecular sieves and purged with nitrogen) followed by nickel ethylhexanoate (0.013 mmol), N,N-dimethyl anilinium tetra (perfluorophenyl)borate (0.013 mmol) and triethylaluminum (650 mmol). After one hour ethanol was injected to the solution to terminate the reaction. The polymer was then precipitated with excess ethanol and was washed with excess acetone, filtered and dried overnight, under vacuum at 80° C. The polymer was isolated in 32% yield and was found by GPC methods to possess an $M_n$ of 38,000 and an $M_w$ of 77,000.

These examples demonstrate the synthesis of ABA block copolymer5s consisting of polynorbornene A blocks and polydimethsiloxane B block by utilizing the ivnyl groups present at the end of each norbornene chain, and an α,ω-dihydride terminated polydimethylsiloxane in a hydrosilation reaction.

EXAMPLE 33

Preparation of a Vinyl-terminated Poly(norbornene)

To a 500 ml stainless steel reactor that had been heated to 70° C. under a full vacuum for 18 hours then cooled, was added 100 g (1.06 mol) norbornene in dichloroethane (400 ml). The reactor was pressurized with ethylene to a pressure of 150 psig. Thereafter catalyst component "A" (see Example 35) (0.435 g, 0.266 mmol) in 2 ml dichloroethane was injected followed by 0.31 ml (2.39 mmol) $BF_3$.etherate and 1.59 ml (2.66 mmol) 1.7M triethylaluminum. After 60 minutes, 10 ml ethanol was injected to short stop the reaction and the resulting polymer was washed with an excess methanol, filtered, and dried overnight, under vacuum at 80° C. The resulting polymer (83.0 g) was found by GPC methods to possess an $M_n$ of 2,350 and an $M_w$ of 5,050 and was terminated with a vinyl group as witnessed by the proton and $^{13}C$ NMR spectra.

Preparation of a Polynorbornene-poly(dimethylsiloxane)-poly(norbornene) Block Copolymer To a 100 ml three neck round bottom flask equipped with a stirring bar, condenser and gas inlet adaptor was added (in a dry box) 5.0 g of a vinyl terminated polynorbornene of $M_n$ 2,350.

To a 30 ml glass vial was added 1.69 g -dihydride terminated polydimethylsiloxane with a molecular weight ($M_n$) of 400. The bottle was purged with $N_2$ and filled with toluene to dissolve the polymer, which was then added to the round bottom flask with the polynorbornene. The mixture was heated to 40° C. and allowed to completely dissolve. To this solution was added 0.01 ml of catalyst component "B" (see Example 35), and the flask was heated to 60° C. for 19 hours. The polymer was precipitated and washed with an excess methanol, filtered and dried overnight, under vacuum at 80° C. The block copolymer was isolated in quantitative yield and was found by GPC methods to possess an $M_n$ of 5,400 and an $M_w$ of 7,700.

EXAMPLE 34

Preparation of a Polynorbornene-poly (dimethylsiloxane)-poly(norbornene) Block Copolymer To a 100 ml three neck round bottom flask equipped with a stirring bar, condensor and gas inlet adaptor was added (in an inert gas filled dry box) 2.5 g of a vinyl terminated polynorbornene of $M_n$ 2350 and 25 ml toluene.

To a 50 ml glass vial was added 15.0 g $\alpha,\omega$-dihydride terminated poly(dimethylsiloxane) of molecular weight ($M_n$) 17,500. The bottle was purged with $N_2$ and filled with 50 ml toluene to dissolve the polymer, which was then added to the round bottom flask with the polynorbornene/toluene solution. The mixture was heated to 50° C. and allowed to completely dissolve. To this solution was added platinum divinyl complex (0.1 ml in xylene, purchased from United Chemical Technologies) and the flask was heated to 90° C. for 72 hours. The polymer was precipitated and washed with an excess methanol, filtered and dried overnight, under vacuum at 80° C. The block copolymer was isolated in quantitative yield. Proton NMR methods indicated that the hydride terminated poly(dimethylsiloxane) had reacted to completion and the vinyl terminated poly(norbornene) was also essentially fully converted.

EXAMPLE 35

Preparation of a Vinyl-terminated Poly(norbornene)

To a 500 ml stainless steel reactor that had been heated to 70° C. under a full vacuum for 18 hours then cooled, was added 100 g (1.06 mol) norbornene in dichloroethane (400 ml). The reactor was pressurized with ethylene (6 psig). Thereafter catalyst component "A" (0.435 g, 0.266 mmol) in 2 ml dichloroethane was injected followed by $BF_3$.etherate (0.31 ml, 2.39 mmol) and 1.7M triethylaluminum (1.59 ml, 2.66 mmol). After 60 minutes, 10 ml ethanol was injected to short stop the catalyst and the resulting polymer was washed with an excess methanol, filtered and dried overnight, under vacuum at 80° C. The polymer was isolated in 94% yield and was found by GPC methods to possess an $M_n$ of 17,700 and an $M_w$ of 68,600 and was terminated with a vinyl group as witnessed by the proton and $^{13}C$ NMR spectra.

Preparation of a Polynorbornene-poly (dimethylsiloxane)-poly(norbornene) Block Copolymer To a 100 ml three neck round bottom flask equipped with a stirring bar, condenser and gas inlet adaptor was added (in a dry box) 5.0 g of the above-described vinyl terminated polynorbornene of $M_n$ 17,700 dissolved in 300 ml p-xylene.

To a 100 ml glass vial was added 17.1 g $\alpha,\omega$-dihydride terminated poly(dimethylsiloxane) of $M_{n1452}$ 62,000. The bottle was purged with $N_2$ and filled with 100 ml p-xylene to dissolve the polymer, which was then added to the round bottom flask containing the polynorbornene solution. The mixture was heated to 60° C. To this solution was added platinum divinyl complex (0.1 ml in xylene, purchased from United Chemical Technologies) and the flask was heated to 60° C. for 19 hours. The polymer was precipitated and washed with an excess methanol, filtered and dried overnight, under vacuum at 80° C. The block copolymer was isolated in quantitative yield.

Catalyst Component "A"

Hexafluoroantimonic acid ($HSbF_6$, 0.45 g, 1.90 mmole) was placed in a dry, nitrogen filled Teflon® bottle with a Teflon® cap/valve containing a magnetic stir-bar and the contents were cooled to -27° C. Thereafter was added nickel ethylhexanoate (8% in mineral spirits, 1.90 mmole) and the resulting mixture was allowed to warm to ambient temperature and was then stirred at ambient temperature for 2 hours.

Catalyst Component "B"

To a clean, dry 100 ml 2-necked flask equipped with a magnetic stir-bar was added $H_2PtCl_6.6H2O$ (1.0 g, 2.45 mmol), ethanol (6.4 ml, 108 mmol), 1,3-divinyl-tetramethyldisiloxane (2.4 ml, 10.73 mmol) and sodium bicarbonate (2.0 g, 23.8 mmol). The mixture was refluxed for 45 minutes and thereafter the heat was removed and the brown mixture was allowed to stand at ambient temperature for 16 hours. The mixture was then filtered under nitrogen and the ethanol removed under vacuum to afford a brown oil. The oil was redissolved in toluene, filtered again and the toluene removed under vacuum to afford the catalyst as a brown oil.

EXAMPLE 36

This example illustrates the copolymerization of ethylene and a vinyl terminated PNB to give a comb block copolymer of PNB attached to a backbone of polyethylene.

Formation of Comb Block Copolymer 2.0 g vinyl terminated polynorbornene with a molecular weight ($M_n$) of 1250 was dissolved in 300 ml of dried, degassed toluene. This mixture was added to a 0.5 liter reactor and heated to 80° C. with agitation. A toluene solution of 5.0 mg of (dimethylsilyl) bis (indenyl) zirconium dichloride was added to the mixture followed by a toluene solution of 5.5 g 10% methylaluminoxane. The reaction was allowed to continue for 0.5 hour under continous ethylene feed at 60 psig. The reaction was terminated by releasing the ethylene pressure and injecting 10 ml of methanol. The polymer was isolated by filtering through a Buchner funnel. This material was stirred with 10% acidic methanol then refiltered and washed with methanol followed by water. The polymer was vacuum dried overnight at 80° C. (Yield 18.93 g). The formation of this comb block copolymer was confirmed by $^1H$ NMR spectroscopy after the product was washed with hot chloroform to eliminate any unreacted vinyl terminated polynorbornene. The comb block copolymer exhibited resonances at 1.4 ppm (indicating the presence of polyethylene runs) and 0.8-2.5 ppm (indicating the incorporation of the norbornene macromonomer) but was devoid of resonances at 5.0 and 5.8 ppm (indicating the abscence of unreacted vinyl terminated polynorbornene.)

EXAMPLE 37

This example demonstrates the use of PMMA/PNB graft copolymer as compatibilizer between PMMA and PNB homopolymers:

Optical microscopy was used to evaluate the PMMA-PNB graft copolymers ability to act as a phase compatibilizer for blends of medium molecular weight PMMA and high molecular weight PNB homopolymers. Polymer solutions were prepared in chlorobenzene at room temperature. Polymer films were then solution cast onto glass microscope slides. Chlorobenzene was removed, by heating the sample in a vaccum oven at 120° C. for 12 hours followed by further heating to 160° C. for 2 hours. Samples were then placed on the microscopy stage for analysis. The magnification on the microscope was 100 times. Two blend samples were prepared. Sample 1 is 90/10 weight % mixture of polynorbornene and PMMA homopolymers that were blended in solution. Two distinct phases, rounded white PMMA phase dispersed in a dark polynorbornene matrix, are clearly visible. The white PMMA phase was observed to be present throughout the sample, with a broad distribution of sizes with a mean of 4.9 μm and a standard deviation of 4.1 μm. Sample 2 is a blend of sample 1 to which 10 weight % of PNB-g-PMMA had been added in solution. The graft copolymer behaving as a polymeric emulsifier increasing the interfacial interaction between the PNB and the PMMA to reduce the domain size. The most noticeable change in the micrograph is the uniformity of the PMMA domains. The size distribution of the PMMA phase was observed to be somewhat narrower, with a mean of 3.7 μm, standard deviation of 1.6 μm. This sample was also observed to wet the glass slide much better than the uncompatibilized sample.

EXAMPLE 38

Polynorbornene homopolymer was reacted with maleic anhydride (MA) to form grafts of succinic anhydride at various percentages (from 0.3 to 4.2%) in chlorobenzene or o-dichlorobenzene with benzoyl peroxide or di-t-butyl peroxide as initiators under nitrogen purge. A typical reaction used 16.8 g pnb homopolymer 12.5 g of maleic anhydride, 1.6% of benzoyl peroxide (0.2 g) in 200 ml di-chlorobenzene under nitrogen. The results in the table below show that the conditions for grafting polynorbornene are favored at 140° C. with benzoyl peroxide as the initiator. In the di-t-butyl peroxide system (experiment 4) a gel was formed at room temperature following the reaction. This result indicated that coupling occurred during the reaction at 160° C. In order to avoid the coupling reaction, the reaction temperature was decreased to 140° C. and the reaction time was extended to 24 hours to lower the free radical concentration in the reacting system. This polymer had 4.2% (by wt.) grafting and was slightly yellowish. The percentage of grafting was measured by modification of a literature method (J. Polym. Polym. Lett. Ed. 21, 2, 1993).

| Experiment No. | Rxn Time (hr) | Rxn Temp (° C.) | Benzoyl peroxide (% of MA) | Di-t-butyl peroxide (ml) | MA Graft (wt %) | Comments |
|---|---|---|---|---|---|---|
| 1 | 2 | 120 | 2 | — | 0.3 | white product |
| 2 | 3 | 130 | 4 | — | 0.6 | white product |
| 3 | 5 | 140 | 3.5 | — | 1.1 | white product |
| 4 | 2 | 160 | — | 1 | 4 | yellow, gel formation at low conc. (5%) |
| 5 | 24 | 140 | — | 1 | 4.2 | slightly yellowish, no gel formation |

EXAMPLE 39

Copolymers of decylnorbornene and norbornene were reacted with maleic anhydride (MA) to form grafts of succinic anhydride in chlorobenzene or o-dichlorobenzene with benzoyl peroxide or di-t-butyl peroxide as initiators under nitrogen atmosphere. When di-t-butyl peroxide was used as an initiator at various temperatures (experiments 4 and 5 in the table below) the viscosities of polymer solutions were low following the reaction and the particle sizes of the polymers after precipitation were small and hard to filter. These results indicate that some degradation of the polymer may have occured during the reaction. Therefore, di-t-butyl peroxide was not favored as an initiator for grafting of decylnorbornene copolymers. The results (experiments 1, 2, 3, 6, and 7) obtained with benzoyl peroxide as an initiator show that a white powder could be obtained indicating slight, if any, degradation. The polynorbornene could be grafted with various amounts of the maleic anhydride. It seems that, unlike homo-polynorbornene systems, benzoyl peroxide is more suitable than di-t-butyl peroxide as an initiator in copolymers containing decylnorbornene.

| Experiment No. | Tg pnb (° C.) | Rxn Time (hr) | Rxn Temp (° C.) | Benzoyl peroxide (% of MA) | Di-t-butyl peroxide (ml) | MA Graft (wt %) | Comments (Mw = 200,000) |
|---|---|---|---|---|---|---|---|
| 1 | 232 | 3 | 140 | 1.6 | — | 1.1 | white product Mw = 148,000 |
| 2 | 232 | 1 | 160 | 4.7 | — | 2.0 | white product Mw = 98,000 |
| 3 | 232 | 1.5 | 160 | 6.4 | — | 3.7 | white product |
| 4 | 232 | 2 | 140 | — | 1 | >6.0 | white product |
| 5 | 232 | 1.5 | 160 | — | 0.2 | ? | white product |

-continued

| Experiment No. | Tg pnb (° C.) | Rxn Time (hr) | Rxn Temp (° C.) | Benzoyl peroxide (% of MA) | Di-t-butyl peroxide (ml) | MA Graft (wt %) | Comments (Mw = 200,000) |
|---|---|---|---|---|---|---|---|
|   | 150 | 3 | 140 | 0.8 | — | 0.5 | white product |
| 7 | 150 | 3 | 140 | 1.6 | — | 1.1 | white product |

EXAMPLE 40

The PNB homo- and copolymers and nylon have different solubility parameters. To make possible the reactive solution blending of grafted PNBs with nylon, a solvent pair was used to dissolve both polymers. The reactive blending of grafted polynorbornenes with nylon was performed using a phenol/o-dichlorobenzene solution (30/130, w/w) at 130° C. Since the phenol was also as a nucleophile, nylon was dissolved in reaction mixture first, followed by addition of grafted polynorbornenes to avoid esterification.

| Experiment No. | pnb (% g) | nylon | Properties of Polymers |
|---|---|---|---|
| 1 | homo- (4.2%) 50% (Ex. 38-5) | 6,6 (crystalline) 50% | clear film, insoluble in formic acid, increased toughness |
| 2 | s.c. (1.1%) 50% (Ex. 39-1) | 6,6 (crystalline) 50% | clear film, partially soluble in formic acid, increased toughness |
| 3 | s.c. (2.0%) 67% (Ex. 39-2) | 12 (crystalline) 33% | clear film, Tm: 180° C., $T_g$: 232° C., increased toughness |
| 4 | s.c. (2.0%) 66% (Ex. 39-2) | (amorphous) 33% | clear film, Tg: 160° C., $T_g$: 232° C., increased toughness |
| 5 | s.c. (3.7%) 50% (Ex. 39-3) | 6,6 (crystalline) 50% | Tm: 260° C. |
| 6 | s.c. (3.7%) 50% (Ex. 39-3) | 12 (crystalline) 50% | Tm: 180° C. |

Experiment 5,6 clearly shows IR evidence of the reaction of the amine terminated nylons for the phthalamide structure (dicarboximide) by a peak at 1710 cm$^{-1}$.

Experiment 5 exhibits mechanical and thermal properties intermediate between the constituents indicating a successful polymer alloy. Non-reactive blends exhibited mechanical properties inferior to the constituents. For example, the strain to break was observed to be 0.7% for the NB-type polymer, 7.7% for the Nylon 6,6 and 1.7% for the alloy.

Experiment 6 exhibits the novel characteristic of having mechanical and thermal properties superior to the individual constituents indicating a synergistic alloy. For example, the NB polymer was observed to have a strain to break of 0.7%, 3.6% for the Nylon 2, and 6.1% for the alloy.

EXAMPLE 41

This example demonstrates the coupling of commercially available toughners to the PNB/succinic anhydride graft copolymers of this invention. Amine terminated polypropylene oxide (Jeffamine®) and amine terminated polybutadienes (Hycar® ATBN) were grafted onto PNB/succinic anhydride copolymers.

Amine Terminated Polybutadiene

| Experiment No. | PNB (% g) | Hycar® ATBN | Reaction Conditions | Properties |
|---|---|---|---|---|
| 1 | s.c. (3.7% MA) (Tg = 232° C.) 90% (Ex 39, 3) | ATBN 1300X21 10% | 120° C. dichlorobenzene | gel formation after 2 min., high cross-linking in reaction |
| 2 | s.c (1.1% MA) (Tg = 232° C.) 90% (Ex. 39-1) | ATBN 1300X21 10% | Room Temperature dichlorobenzene | white product, low clarity of film, color change after press at 305° C., tougher |
| 3 | s.c. (1.1% MA) (Tg = 232° C.) 95% (Ex. 39-1) | ATBN 1300X21 5% | Room Temperature dichlorobenzene | white product, low clarity of film, color change after press at 305° C., tougher |
| 4 | s.c. (0.5% MA) (Tg = 150° C.) 95% (Ex. 39-6) | ATBN 1300X45 5% | Room Temperature chlorobenzene, | white product, excellent clarity of film, colorless, very tough, DMA, Flexural module test |
| 5 | s.c. (0.5% MA) (Tg = 150° C.) 90%, (Ex. 39-6) | ATBN 1300X45 10% | Room Temperature chlorobenzene | white product, excellent clarity of film, very tough, colorless |

To avoid the thermo-oxidation of the ATBN during the process, two types of polynorbornenes ($T_g$: 232° C. & 150° C.) were chosen for these runs. When a polynorbornene with a high maleic anhydride content was used, a gel formed upon addition of the ATBN after reacting for 2 min. This result indicated that crosslinking occurred during the reaction and that the reactivity of the amine group on Hycar® was high at 120° C. Subsequent studies used lower grafting contents and lower reaction temperatures. While the reaction products using room temperature and lower grafted amounts of maleic anhydride looked good, the products were not stable at 305° C. which was required for pressing the films (color change and films of low clarity). These results indicate that the impurity (alkyl amine) and the unsaturation of the ATBN might affect the color intensity and clarity of the film. Therefore, a high purity ATBN HYCAR® (ATBN 1300×45) and low glass transition temperature polynorbornene (Tg=150° C.) were used to investigate Hycar® toughening. The sample with the best visual appearance (experiment 4) yielded films having excellent clarity, very low color intensity and very good toughness.

Reactive Blending: Grafted Polynorbornene & Jeffamine ®

| Experiment No. | pnb(%-g) | Jeffamine ® | Properties of Polymers |
|---|---|---|---|
| 6 | homo-(4.2%-g) 70%(Ex. 38-5) | D-2000 30% | difficulty to filter, swell or gel no further investigation |
| 7 | s.c. (1.0%) 90%(Ex. 39-1) | D-2000 10% | white product, excellent clarity of film, colorless, color change after pressing at 305° C., tough, $T_g$ = 194° C. |
| 8 | s.c.(1.0%) 90%(Ex 39-1) | ED-2001 10% | white product-strain at break = 3.3% |

In the homo-polynorbornene system, the product was very difficult to isolate and no further investigation was performed. The amine termined polypropylene oxide (ATPO) (experiment 7) was reacted with side chain plasticized polynorbornene (norbornene/decylnorbornene copolymer) at room temperature. A colorless and highly transparent film was cast from the reaction mixture. The film had very good toughness. However, the color changed after pressing the film at 305° C. To allow better high temperature performance, an ATPO having a higher degree of amination was employed (experiment 8). The product was colorless after drying at 150° C. for 4 hours under vacuum. Infrared analysis showed evidence for the phthalimide structure, but with other groups contributing to the 1735 cm$^{-1}$ band, changing the usual ratio of the 1710 cm$^{-1}$ to the 1735 cm$^{-1}$ band which is characteristic of the phthalimide structure.

EXAMPLE 42

| Experiment No. | pnb(%-g) | Silicone | Properties of Polymers |
|---|---|---|---|
| 1 | s.c.(1.0%) 90% (Ex. 39-1) | DMS-A21 10% | colorless, transparent film from solution casting, toughness increased after exposure to 150° C. for 3 hours |
| 2 | s.c.(1.0%) 90% (Ex. 39-1) | DMS-A32 10% | colorless, transparent film from solution casting, toughness increased after exposure to 150° C. for 3 hours |
| 3 | s.c.(1.0%) 90% (Ex. 39-1) | DMS-A15 10% | colorless, transparent film from solution casting, toughness increased after exposure to 150° C. for 3 hours |
| 4 | s.c.(1.0%) 90% (Ex. 39-1) | DMS-A21 10% | Excellent clarity of film and bar were obtained after pressing at 305° C.-strain a break = 3.3% |

Amine terminated silicones were coreacted with maleic anhydride grafted polynorbornene. In this investigation, various molecular weights of amine terminated silicones were chosen to toughen the polynorbornene. The results of reactions of silicones with grafted polynorbornenes at room temperature with the composition fixed at 10% amine terminated silicone are set forth below. The reactions were allowed to proceed overnight. Films that were cast from the reaction solution were brittle, but highly transparent. However, the films increased in toughness after heating in the vacuum oven at 130° C. The reaction products which had been dried similarly in the vacuum oven could not be pressed into films, presumably because the drying at elevated temperatures caused some crosslinking. An alternative method (experiment 4) was carried out by drying the sample at room temperature under vacuum, then transparent, colorless films and DMA bars could be obtained by pressing the uncured sample at 305° C.

Mechanical testing was performed on thin films in tension. The strain at break for the silicone film was 3.3%, which is again better than 0.6% for the base copolymer. Flexural modulus exhibited a strain to break of 3.1%, with a Flexural modulus of 177,000 psi, not much below the 181,000 psi for the base copolymer. Infrared analysis showed evidence for the phthalimide structure.

EXAMPLE 43

This example demonstrates that high $T_g$ (380°) polycyclic addition polymers (polynorbornene $M_w$=200,000) can be plasticized by hydrocarbon plasticizers.

A hydrogenated cyclopentadiene (CPD) oligomer ($T_g$ 85° C., $M_w$ 480, available under the Escorez trademark, Exxon Chemicals) was blended with polynorbornene homopolymer. One gram mixtures of the PNB/CPD oligomer were dissolved in 25 ml chlorobenzene and precipitated in 1000 ml of chilled methanol. Blended samples gave transparent film. The movement of the $T_g$ and the transparency of the films suggest that these materials are miscible. Results are set forth below:

| Experiment No. | wt % Fraction PNB | Blend $T_g$ (° C.) |
|---|---|---|
| 1 | 0.50 | 178 |
| 2 | 0.60 | 187 |
| 3 | 0.70 | 207 |
| 4 | 0.80 | 239 |
| 5 | 0.90 | 294 |

$T_g$ of the precipitated Escorez is around 93° C. Samples give transparent films. The movement of the $T_g$ and transparency suggest that these materials are miscible.

Plasticization of PNB (norbornene/decylnorbornene copolymer, 10 mol % decylnorbornene, $M_w$ 200,000) by linear alkanes is dependent on the molecular weight of the alkane, and requires decylnorbornene in the base copolymer structure. With 20 volume % of the alkane, the following results were observed:

| Experiment No. | # Carbons in Alkane | Tg (° C.) | Strain at break | Film Characteristics |
|---|---|---|---|---|
| 6 | — | 282 | <1% | transparent |
| 7 | 20 | 190 | <1% | transparent |
| 8 | 22 | 172 | <1% | transparent |
| 9 | 24 | 138 | 1% | transparent |
| 10 | 28 | 120 | 3% | transparent |
| 11 | 32 | 122 | 6% | transparent |
| 12 | 36 | 140 |  | cloudy |

Limited plasticization with homo-polynorbornene, can depress the $T_g$ from 380° C. to 230° C. with $C_{30+}$ alpha olefin, and to 260° C. with paraffin using the method described above.

KRATON® G/PNB blend: polynorbornene homopolymer ($M_n$ 209,000) with KRATON® G (1652), more detailed study showed solution blend of 50% KRATON® G and 50% PNB and decylnorbornene copolymer gave the unusual result of a transparent film, with domain sizes less than 1 μm, below the limit of detection with an optical microscope. Closer examination of a cryogenically microtomed sample with TEM using RuO$_4$ stain indicated a fine structure of approximately 15 nm. Tensile properties were indicative of a co-continuous network with a Tensile modulus of 2 Gpa and a strain at break of 7% for the homopolynorbornene blend. This compares to a tensile modulus of 70 MPa and a strain at break of 80% for a PNB of molecular weight of 2,000,000 which also gave domain sizes on the order of 1 $\mu$m clearly indicating that KRATON® G is the continuous phase with PNB being the dispersed phase, also supported by microscopy. The high tensile modulus and low strain to break given the same composition (50 wt % PNB homopolymer/50 wt % KRATON® G) for exhibiting the small domain size suggest that both constituents are contributing to the mechanical properties and suggest a novel, co-continuous morphology.

EXAMPLE 44

Into a 100 ml single neck round bottom flask containing a magnetic stirrer, was added 5.0 g (2.08 mmoles) of epoxy terminated polynorbornene of molecular weight ($M_n$) 2200 g/mole. To this 175 ml of tetrahydrofuran (THF) was added and after the polymer had dissolved, 2 ml (6.25 mmoles) of 60 wt % perchloric acid in water was added, followed by 1 ml of de ionized water. The solution was stirred for 12 hours at room temperature after which the polymer was isolated by slowly adding the reaction solution into water. The precipitated polymer was filtered, dissolved in THF and was reprecipitated to remove any trace of acid. The polymer was filtered, dissolved in chloroform and stirred over anhydrous magnesium sulfate to remove trace amounts of water, filtered over celite and solvent was removed using a rotovap to obtain a white solid. The solid was further dried at 50° C. in a vacuum oven. Yield 4.45 g. The reaction was confirmed using $^1$H NMR. The disappearance of the resonance's at 2.7 and 2.9 ppm and the appearance of new resonance's at around 3.3 and 3.5 ppm corresponding to the methylene and the methine protons attached to a hydroxyl group confirms the formation of the diol.

EXAMPLE 45

This example illustrates a reaction between monoalcohol and an acid chloride to give terminal ester functionality.

Into a 50 ml two neck round bottom fitted with a condenser and a magnetic stirrer, was added 3.0 g (0.75 mmoles) of monohydroxy terminated polynorbornene of molecular weight 4000 ($M_n$) g/mole. To this 100 ml of tetrahydrofuran (THF) and 0.6 ml (7.5 mmoles) of pyridine was added. The polymer was allowed to dissolve after which 0.34 g (3.75 mmoles) of acryloyl chloride was added, dropwise into the reaction flask. The solution was stirred for 10 hours at room temperature after which the polymer was isolated by slowly adding the reaction solution into water. The precipitated polymer was filtered, and was transferred into a separator funnel. The solution was washed several times with water, followed by aqueous sodium bicarbonate solution. The chloroform layer was separated from the aqueous layer, stirred over anhydrous magnesium sulfate and carbon black, filtered over celite and solvent was removed using a rotovap to obtain a light tan color solid. The solid was further dried at in a vacuum oven. Yield 1.85 g. The reaction was confirmed using $^1$H NMR. The disappearance of the resonance 3.7 ppm and the appearance of new resonance's at around 4.2 ppm corresponding to the methylene group attached to an ester group and the terminal alkene protons appearing at 5.8, 6.1 and 6.3 ppm's confirms the conversion of the hydroxy groups to the acrylic ester functionality.

EXAMPLE 46

This example demonstrates the grafting of acrylate type monomers on to PNB.

Into a two necked, 100 ml round bottom flask fitted with a overhead mechanical stirrer and an argon inlet, was added 1.0 g (5×10$^{-6}$ moles) of polynorbornene ($M_w$≈200,000 g/mole) under argon atmosphere. To this, 10 ml's of dichlorobenzene was syringed in and heated to 90° C. To this 5.5 g (0.055 moles) of freshly distilled methyl methacrylate and 0.05 g of di t-butyl peroxide were added. The reaction was stirred for about 2 hours at 90° C. during which time the solutions viscosity was observed to increase. After 2 hours, the flask was further heated to 150° C. for and held there for 3 hours. The solution was cooled, diluted with chloroform and precipitated into methanol to obtain a white polymer, which was dried at 100° C. in a vacuum oven. In order to the polynorbornene/poly(methyl methacrylate) graft copolymer from the poly(methyl methacrylate) homopolymer, a portion of the sample was extracted with acetone and centrifuged to obtain an acetone soluble fraction and an acetone insoluble fraction. $^1$H NMR of the acetone insoluble fraction indicated the presence of pure poly(methyl methacrylate), while the $^1$H NMR analysis of the acetone insoluble polymer indicated the presence of aliphatic ester protons at 3.6 ppm corresponding to the poly(methyl methacrylate) and a broad peak appearing around 1-2.5 ppm corresponding to the aliphatic protons of norbornene polymer. Also films of the acetone insoluble material, cast from cyclohexane was observed to be clear and transparent. The clear film obtained from the acetone insoluble material followed by the presence of methyl ester protons from NMR are a clear evidence for grafting of poly(methyl methacrylate) on to polynorbornene polymers. GPC performed on the polymer indicated a single sharp peak with a weight average molecular weight of 485,000 and a polydispersity of 4.8.

EXAMPLE 47

Example for the Synthesis of Urethane/PNB Graft Copolymer

Into a 50 ml two neck round bottom fitted with a condenser and a magnetic stirrer, was added under an argon atmosphere, 0.45 g (0.187 mmoles) of dihydroxy terminated polynorbornene of molecular weight 2400 ($M_n$) g/mole. To this 10 ml of chlorobenzene and 0.01 ml of dibutyltin dilaurate was added. The polymer was allowed to dissolve after which 0.05 g (0.42 mmoles) of phenyl isocyanate was added, dropwise into the reaction flask. The solution was stirred for 5 hours at 125° C. after which the polymer was isolated by slowly adding the reaction solution into methanol. The precipitated polymer was filtered, washed with methanol and dried at 75° C. in a vacuum oven. Yield 0.39 g. The reaction for the formation of the urethane linkage was confirmed using $^1$H NMR. The disappearance of the resonance 3.7 ppm corresponding to the methylene and the methine protons attached to an oxygen, followed by the appearance of new resonance at around 4.2 ppm corresponding to the methylene group attached to an ester, 6.4 corresponding to an amide proton and the aromatic protons appearing at 7.1 and 7.4 ppm's confirms the conversion of the hydroxy groups to the urethane functionality.

EXAMPLE 48

This example illustrates the ability to react amine-functional molecules (e.g., azo dyes) with a maleic anhydride-grafted PNB.

Grafting of aniline onto a maleic-anhydride grafted PNB.

A 1.1% maleic anhydride-grafted polynorbornene (5.0 g) was dissolved in 100 mL toluene in a 3 neck 250 ml round bottom flask by heating the sample to 100° C. To this solution 48 microliters of aniline was added. The solution was allowed to react at 100° C. for an additional 45 min. About 50 ml of solvent were then removed by simple distillation. The solution was cooled to room temperature overnight. The mixture was then poured into MeOH (500 ml) to precipitate the polymer. Infrared analysis of the resulting material showed that both the amic acid and fully imidized structure was present indicating that the aniline had reacted with the maleic anhydride graft on the polynorbornene.

EXAMPLE 49

This experiment shows how incorporation of an appropriate comonomer into PNB can change the miscibility of the PNB with a chosen polymer, in this case polystyrene.

a) Synthesis of 5-phenylnorbornene

Dicyclopentadiene (180 g), styrene (140 g), toluene (36 g), and N,N-diethylbydroxylamine (0.35 g) (added as a polymerization inhibitor) were added to a stainless steel reactor. The mixture was heated to 150° C. for 6 hours. The low boiling fraction was removed from the resulting reaction mixture on the roto-vap. The remaining higher boiling fraction was fractionally distilled. The fraction distilling at 130° C. @ 4 mm Hg was analyzed by GC and found to be 96% 5-phenylnorbornene.

b) Copolymerization of Norbornene and 5-phenylnorbornene

Norbornene (4.50 g) and 5-phenylnorbornene (0.90 g) were dissolved in dichloroethane (60 ml). To this degassed solution was added [(crotyl)Ni(1,5-cyclooctadiene)]PF$_6$ (0.0095 g). Polymer began to precipitate from solution after several minutes. After 1 hour the mixture was added to MeOH to precipitate the remaining polymer. After filtering and drying the solid, 1.92 g of powder was isolated. NMR analysis determined the phenylnorbornene incorporation to be 35 mol %. By GPC determination, the $M_w$=333,000 and $M_n$=161,000.

c) Copolymerization of Norbornene and 5-phenylnorbornene

The procedure was the same as in the above example, except that the following amounts of monomers were used: 5.0 g of 5-phenylnorbornene and 2.45 g of norbornene. After the initial 0.0095 g of [(crotyl)Ni(1,5-cyclooctadiene)]PF$_6$ was added, no polymer precipitated, therefore an additional 0.095 g of [(crotyl)Ni(1,5-cyclooctadiene)]PF$_6$ was added. After stirring overnight, the mixture was poured into 500 ml of MeOH to precipitate the polymer. After filtering and drying, 4.17 g of polymer was isolated. NMR analysis determined the phenylnorbornene incorporation to be 4 mol %. The $M_w$ was determined to be 37,800 and the $M_n$ was determined to be 17,100 by GPC.

d) Miscibility of Norbornene/Phenylnorbornene Copolymers in Polystyrene

Norbornene/phenyl norbornene copolymers containing 4% and 35% phenyl norbornene. Blends of the above materials with polystyrene were prepared by dissolving the appropriate norbornene/phenyl norbornene copolymers and polystyrene in chloroform and precipitating the solution of the two polymers in methanol. The precipitated polymers were filtered, dried in a vacuum oven at 120° C. for 12 hours, followed by further drying at 180° C. for 2 hours. Using the above method, phenyl norbornene/norbornene copolymers were blended with polystyrene of two different molecular weights; 5000 g/mole & 95,000 g/mole in a 75/25 wt. ratio. Miscibility of the two polymers was analyzed using differential scanning calorimetric analysis (DSC). All DSC analysis were performed under nitrogen atmosphere, at a heating rate of 20° C./min. DSC analysis of the norbornene/phenyl norbornene copolymers indicated a single $T_g$, at 391° C. for the material containing 4% phenyl norbornene and at 299° C. for the material containing 35% phenyl norbornene. The glass transition temperatures for polystyrene of molecular weights 5000 g/mole and 95,000 g/mole were observed to be 96° C. and 103° C. respectively. DSC analysis on the blends of norbornene/phenyl norbornene copolymer containing 4% of phenyl norbornene and polystyrene of molecular weight 5000 g/mole indicated two glass transitions at 95° C. and 382° C., thus indicative of a immiscible system. But the DSC analysis on the blends of norbornene/phenyl norbornene copolymer containing 35% of phenyl norbornene and polystyrene of molecular weight 5000 g/mole indicated only one glass transition in-between the two homo-polymer glass transition temperatures at around 220° C. indicative of a miscible system. Changing the molecular weight of the polystyrene to 95,000 g/mole from 5000 g/mole, results in the appearance of two glass transition temperatures for both the 4% and 35% poly(norbornene/phenyl norbornene)/polystyrene blend samples corresponding to the glass transition temperatures of the homopolymers. It should be pointed out that the second glass transition temperature corresponding to the poly(norbornene/phenyl norbornene) copolymer containing 35% phenyl norbornene comonomer was broad indicating probably partial miscibility with the high molecular weight polystyrene.

EXAMPLE 50

These experiments show that PNB can be chlorinated either by photolysis (if the polymers are saturated) or without photolysis (if the polymers are unsaturated).

Equipment

Chlorination reactions were carried out in a jacketed, cylindrical, ACE-glass reaction flask with a multiport head fitted with a stirrer, Dewar condenser, thermometer well, vacuum port and a gas dip tube. Ultraviolet initiation was obtained using blacklight flourescent circleline lamps which surrounded the reactor. The chlorine feed system consisted of a continuosly weighed chlorine lecture bottle connected to the gas dip tube. Chlorine flow was manually controlled with a throttling valve. A high purity nitrogen supply was also connected to the gas dip tube. The reaction temperature was controlled with a Haake circulating water bath.

Experimental Procedure

In a typical solution chlorination the reactor was charged with the resin and 1,1,2,2-tetrachloroethane and then brought to 50°-60° C. with stirring to effect dissolution. After dissolution the reaction system was evacuated and purged with nitrogen twice. The system was then evacuated and chlorine was introduced until the solution was saturated as indicated by chlorine condensing in the Dewar which was filled with dry ice. All reactions were run at near atmospheric pressure. The UV lights were activated upon achieving saturation (chlorinations of the vinyl terminated and 5-ethylidene-2-norbornene copolymers were conducted without UV light in an aluminum foil-shielded reactor). Chlorine was added continuously until the amount needed to reach the desired combined chlorine level was achieved. Reaction times were less than one hour. The gaseous hydrochloric acid that formed during the reaction passed through the Dewar uncondensed to a caustic scrubber. The reactor contents were purged with nitrogen after reaction to remove excess chlorine to the caustic scrubber. The chlorinated polymer was recovered from solution by slow addition to methanol with agitation. The precipitated polymer was filtered, washed with methanol, filtered and dried under vacuum at 50°-60° C. for 24-48 hours. See the table below for details of experiments and analytical results.

Chlorination of Norbornene Homo- and Copolymers

| Experiment No. | Polymer Starting Material* | Photolysis | % Cl | Cone Calorimetry Results |
|---|---|---|---|---|
| 1 | NB/NB-10 copolymer | yes | 25 | — |
| 2 | NB homopolymer | yes | 27 | — |
| 3 | NB/ENB copolyer | no | 25 | — |
| 4 | vinyl-term PNB | no | 15 | — |
| 5 | NB-10 homopolymer | yes | 23 | chlorinated polymer-890 KW/m² control polymer-1840 KW/m² |
| 6 | NB/NB-10 copolymer | yes | 24 | — |

*NB = norbornene
NB-10 = 5-decyl-2-norbornene
vinyl-term = vinyl terminated

We claim:

1. A polycyclic addition polymer consisting essentially of polycyclic repeating units wherein a portion of said repeating units contain pendant epoxide containing substituents represented by the formula:

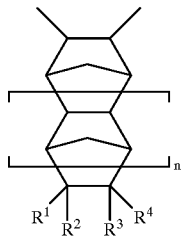

wherein n is 0 to 4, and $R^1$ to $R^4$ independently represents hydrogen, linear and branched $C_1$ to $C_{20}$ alkyl, hydrocarbyl substituted and unsubstituted $C_5$ to $C_{10}$ cycloalkyl, $C_6$ to $C_{24}$ aryl, and $C_7$ to $C_{15}$ aralkyl, with the proviso that at least one of $R^1$ to $R^4$ alone or taken together represents an epoxide containing substituent.

2. The polymer of claim 1 wherein at least one of $R^1$ to $R^4$ is selected from an epoxide substituent represented by the group:

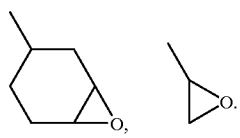

3. The polymer of claim 1 containing a repeating unit wherein $R^3$ and $R^4$ are taken together with the ring carbon atom to which they are attached to form a repeating unit represented by the structure:

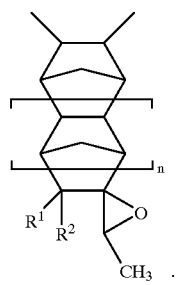

4. The polymer of claim 1 containing a repeating unit wherein $R^1$ and $R^4$ taken together with the two ring carbon atoms to which they are attached to form a repeating unit represented by the structure:

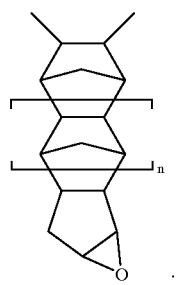

5. A polycyclic addition polymer consisting essentially of polycyclic repeating units represented by the formula:

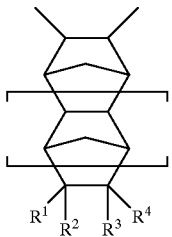

wherein n is 0 to 4, and $R^1$ to $R^4$ independently represents hydrogen, linear and branched $C_1$ to $C_{20}$ alkyl, hydrocarbyl substituted and unsubstituted $C_5$ to $C_{10}$ cycloalkyl, $C_6$ to $C_{24}$ aryl, and $C_7$ to $C_{15}$ aralkyl, and wherein one terminal end of the polymer chain is terminated with an epoxide group.

6. The polymer of claim 5 wherein the terminal epoxide group is selected from a substituent represented by the group:

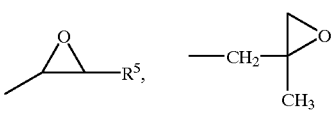

7. A polycyclic addition polymer consisting essentially of polycyclic repeating units wherein a portion of said repeating units contain pendant epoxide containing substituents and wherein one terminal end of the polymer chain is terminated with an epoxide group, said repeating unit containing the pendant epoxide repeating substituent is represented by the structure:

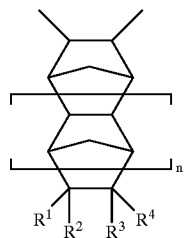

wherein n is 0 to 4, and $R^1$ to $R^4$ independently represents hydrogen, linear and branched $C_1$ to $C_{20}$ alkyl, hydrocarbyl substituted and unsubstituted $C_5$ to $C_{10}$ cycloalkyl $C_6$ to $C_{24}$ aryl, and $C_7$ to $C_{15}$ aralkyl, with the proviso that at least one of $R^1$ to $R^4$ alone or taken together represents said pendant epoxide containing substituent.

8. The polymer of claim 7 wherein at least one of $R^1$ to $R^4$ is selected from an epoxide substituent represented by the group:

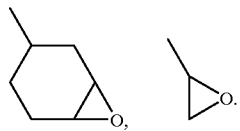

9. The polymer of claim 7 containing a repeating unit wherein $R^3$ and $R^4$ are taken together with the ring carbon atom to which they are attached to form a repeating unit represented by the structure:

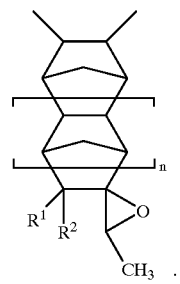

10. The polymer of claim 7 containing a repeating unit wherein $R^1$ and $R^4$ taken together with the two ring carbon atoms to which they are attached to form a repeating unit represented by the structure:

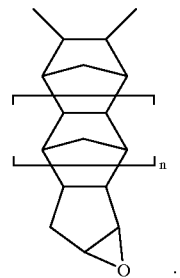

11. The polymer of claim 7 wherein the terminal epoxide group is selected from a substituent represented by the group:

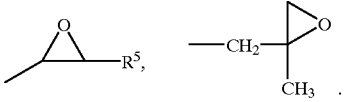

* * * * *